United States Patent
Doherty et al.

(10) Patent No.: US 12,157,580 B2
(45) Date of Patent: Dec. 3, 2024

(54) SYSTEMS AND METHODS FOR TRANSFERRING AIRCRAFT

(71) Applicant: Joby Aero, Inc., Santa Cruz, CA (US)

(72) Inventors: Jalen Doherty, San Francisco, CA (US); Ian Andreas Villa, San Francisco, CA (US); Matthew Derkach, San Francisco, CA (US); Philipp Haban, San Francisco, CA (US)

(73) Assignee: JOBY AERO, INC., Santa Cruz, CA (US)

( * ) Notice: Subject to any disclaimer, the term of this patent is extended or adjusted under 35 U.S.C. 154(b) by 186 days.

(21) Appl. No.: 17/244,163

(22) Filed: Apr. 29, 2021

(65) Prior Publication Data

US 2021/0339885 A1 Nov. 4, 2021

Related U.S. Application Data

(60) Provisional application No. 63/017,162, filed on Apr. 29, 2020.

(51) Int. Cl.
*B64F 1/00* (2024.01)
*G05D 1/00* (2006.01)

(52) U.S. Cl.
CPC .......... *B64F 1/002* (2013.01); *G05D 1/0214* (2013.01); *G05D 1/0225* (2013.01)

(58) Field of Classification Search
CPC .......... B64F 1/002; B64F 1/228; B64F 1/227; B64F 1/007; B64F 1/10; B64F 1/222;
(Continued)

(56) References Cited

U.S. PATENT DOCUMENTS 3,035,789 A 5/1962 Young
4,022,405 A 5/1977 Peterson
(Continued)

FOREIGN PATENT DOCUMENTS

CN 107703944 A * 2/2018 .......... G05D 1/0214
EP 0945841 A1 9/1999
(Continued)

OTHER PUBLICATIONS

Machine Translation of CN107703944A (Year: 2018).*
(Continued)

*Primary Examiner* — Anne Marie Antonucci
*Assistant Examiner* — Jordan T Smith
(74) *Attorney, Agent, or Firm* — Dority & Manning, P.A.

(57) ABSTRACT

Systems and methods for transferring aircraft within a landing area of an aerial transport are provided. A system includes a plurality of robotic devices configured to move aircraft within the landing area. The system obtains facility data to dynamically determine accessible and prohibited areas of the landing area. The system determines a robotic device to transfer an aircraft based on map data representing the prohibited/accessible areas of the landing area and robotic data representing attributes of each robotic device. The system determines a number of routes for the selected robotic device to transfer the aircraft within the landing area while avoiding prohibited areas of the landing area. The system generates command instructions for the selected robotic device and provides the command instructions to the selected robotic device to travel in accordance with the number of routes.

20 Claims, 10 Drawing Sheets

(58) Field of Classification Search
CPC ....... B64F 1/224; B64F 1/225; G05D 1/0214; G05D 1/0225; G05D 1/0287; G05D 1/0291; G05D 1/0011; G05D 1/083
See application file for complete search history.

(56) References Cited

U.S. PATENT DOCUMENTS

| | | | |
|---|---|---|---|
| 5,823,468 | A | 10/1998 | Bothe |
| 5,839,691 | A | 11/1998 | Lariviere |
| 5,842,667 | A | 12/1998 | Jones |
| 6,343,127 | B1 | 1/2002 | Billoud |
| 6,892,980 | B2 | 5/2005 | Kawai |
| 8,016,226 | B1 | 9/2011 | Wood |
| 8,020,804 | B2 | 9/2011 | Yoeli |
| 8,311,686 | B2 | 11/2012 | Herkes et al. |
| 8,733,690 | B2 | 5/2014 | Bevirt et al. |
| 8,737,634 | B2 | 5/2014 | Brown et al. |
| 8,849,479 | B2 | 9/2014 | Walter |
| 9,205,930 | B2 | 12/2015 | Yanagawa |
| 9,387,928 | B1 | 7/2016 | Gentry et al. |
| 9,415,870 | B1 | 8/2016 | Beckman et al. |
| 9,422,055 | B1 | 8/2016 | Beckman et al. |
| 9,435,661 | B2 | 9/2016 | Brenner et al. |
| 9,442,496 | B1 | 9/2016 | Beckman et al. |
| 9,550,561 | B1 | 1/2017 | Beckman et al. |
| 9,663,237 | B2 | 5/2017 | Senkel et al. |
| 9,694,911 | B2 | 7/2017 | Bevirt et al. |
| 9,771,157 | B2 | 9/2017 | Gagne et al. |
| 9,786,961 | B2 | 10/2017 | Dyer et al. |
| 9,802,702 | B1 | 10/2017 | Beckman et al. |
| 9,816,529 | B2 | 11/2017 | Grissom et al. |
| 9,838,436 | B2 | 12/2017 | Michaels |
| 10,140,873 | B2 | 11/2018 | Adler et al. |
| 10,152,894 | B2 | 12/2018 | Adler et al. |
| 10,216,190 | B2 | 2/2019 | Bostick et al. |
| 10,249,200 | B1 | 4/2019 | Grenier et al. |
| 10,304,344 | B2 | 5/2019 | Moravek et al. |
| 10,330,482 | B2 | 6/2019 | Chen et al. |
| 10,593,215 | B2 | 3/2020 | Villa |
| 10,593,217 | B2 | 3/2020 | Shannon |
| 10,752,365 | B2 | 8/2020 | Galzin |
| 10,759,537 | B2 | 9/2020 | Moore et al. |
| 10,768,201 | B2 | 9/2020 | Luo et al. |
| 10,832,581 | B2 | 11/2020 | Westervelt et al. |
| 10,836,470 | B2 | 11/2020 | Liu et al. |
| 10,913,528 | B1 | 2/2021 | Moore et al. |
| 10,948,910 | B2 | 3/2021 | Taveira et al. |
| 10,960,785 | B2 | 3/2021 | Villanueva et al. |
| 11,130,566 | B2 | 9/2021 | Mikic et al. |
| 11,145,211 | B2 | 10/2021 | Goel et al. |
| 11,238,745 | B2 | 2/2022 | Villa et al. |
| 11,295,622 | B2 | 4/2022 | Goel et al. |
| 2006/0214816 | A1* | 9/2006 | Schell .................. G08G 5/0078 340/961 |
| 2010/0079342 | A1 | 4/2010 | Smith et al. |
| 2011/0015816 | A1* | 1/2011 | Dow ........................ G05D 1/00 701/23 |
| 2013/0184977 | A1* | 7/2013 | Venkatasubramanian ................... G05D 1/0289 701/117 |
| 2014/0179535 | A1 | 6/2014 | Stückl et al. |
| 2014/0249736 | A1* | 9/2014 | Beda ..................... G08G 5/065 701/120 |
| 2016/0311529 | A1 | 10/2016 | Brotherton-Ratcliffe et al. |
| 2017/0197710 | A1 | 7/2017 | Ma |
| 2017/0357914 | A1 | 12/2017 | Tulabandhula et al. |
| 2018/0018887 | A1 | 1/2018 | Sharma et al. |
| 2018/0033320 | A1* | 2/2018 | Castelli ................. B64D 47/08 |
| 2018/0053425 | A1 | 2/2018 | Adler et al. |
| 2018/0216988 | A1 | 8/2018 | Nance |
| 2018/0308366 | A1 | 10/2018 | Goel et al. |
| 2018/0354636 | A1 | 12/2018 | Darnell et al. |
| 2018/0373246 | A1* | 12/2018 | Laughlin ................ G06Q 50/30 |
| 2019/0146508 | A1 | 5/2019 | Dean et al. |
| 2019/0172361 | A1* | 6/2019 | Schwindt ............. G08G 5/0021 |
| 2019/0221127 | A1 | 7/2019 | Shannon |
| 2019/0316849 | A1 | 10/2019 | Abrego et al. |
| 2020/0055594 | A1* | 2/2020 | Tal .......................... B64F 1/31 |
| 2020/0103922 | A1 | 4/2020 | Nonami et al. |
| 2020/0182637 | A1 | 6/2020 | Kumar et al. |
| 2020/0207230 | A1* | 7/2020 | Evans ..................... B60L 53/34 |
| 2020/0388166 | A1 | 12/2020 | Rostamzadeh et al. |
| 2021/0201686 | A1* | 7/2021 | Villa ....................... G08G 1/005 |

FOREIGN PATENT DOCUMENTS

| | | |
|---|---|---|
| EP | 2698749 A1 | 2/2014 |
| EP | 3499634 A1 | 6/2019 |
| JP | 2010095246 A | 4/2010 |
| JP | 2013086795 A | 5/2013 |
| WO | WO 2018023556 A1 | 2/2018 |
| WO | WO 2019089677 A1 | 5/2019 |
| WO | WO 2020252024 A1 | 12/2020 |

OTHER PUBLICATIONS

Bennaceur et al., "Passenger-centric urban air mobility: Fairness trade-offs and operational efficiency", Transportation Research: Emerging Technologies, 2021, 29 pages.

Jong, "Optimizing cost effectiveness and flexibility of air taxis: A case study for optimization of air taxi operations", University of Twente, Master's thesis, 2007, 62 pages.

Miao et al., "Data-driven robust taxi dispatch under demand uncertainties", IEEE Transactions on Control Systems Technology 27, No. 1, 2017, 16 pages.

Miao et al., "Taxi dispatch with real-time sensing data in metropolitan areas: A receding horizon control approach", In Proceedings of the ACM/IEEE Sixth International Conference on Cyber-Physical Systems, 2015, 15 pages.

Uber, "Fast-forwarding to a future of on-demand urban air transportation", 2016, 99 pages.

* cited by examiner

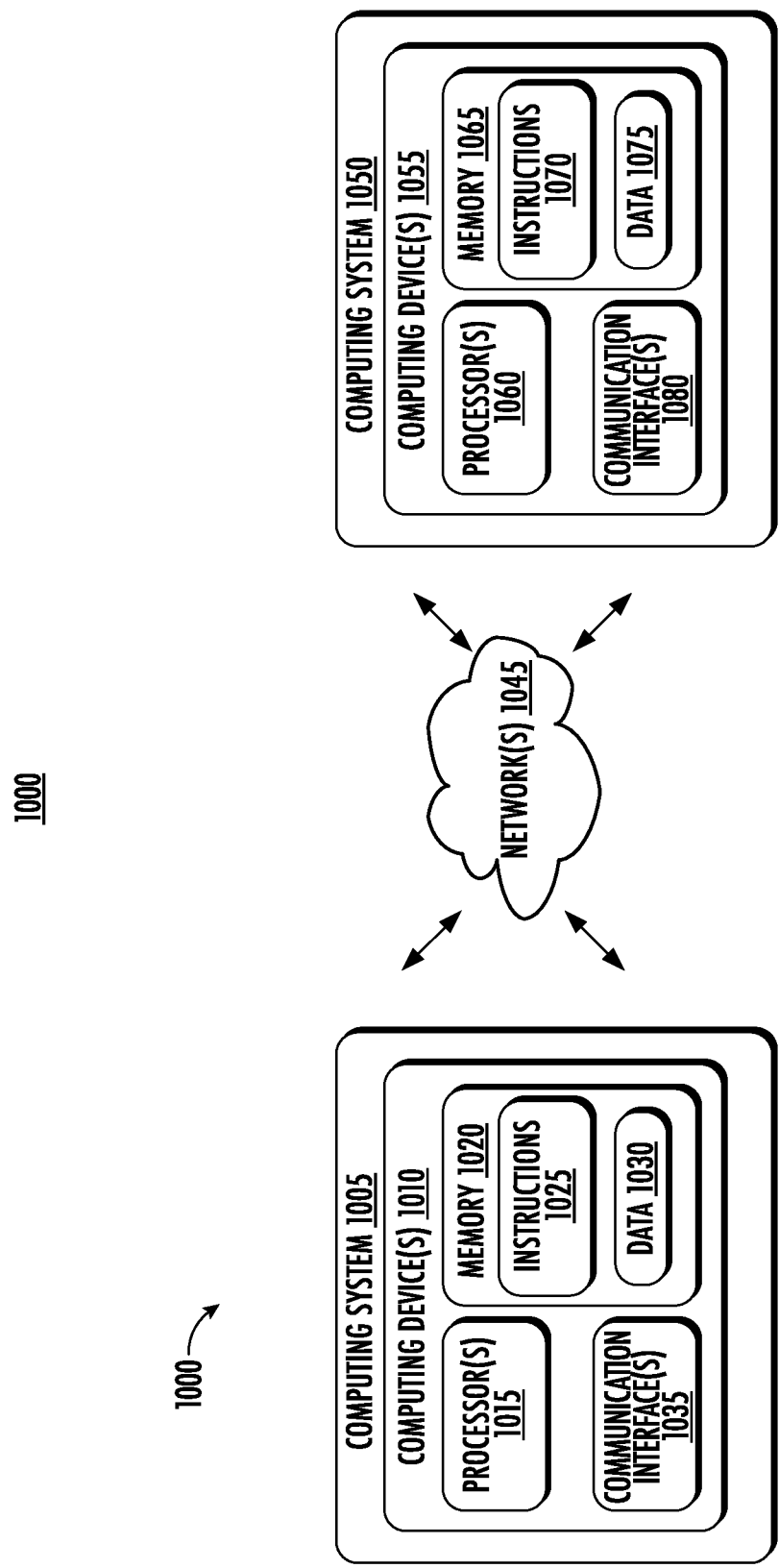

This application claims priority to and the benefit of U.S. Provisional Patent Application No. 63/017,162, filed Apr. 29, 2020, which is hereby incorporated by reference in its entirety.

SYSTEMS AND METHODS FOR TRANSFERRING AIRCRAFT

RELATED APPLICATIONS

This application claims priority to and the benefit of U.S. Provisional Patent Application No. 63/017,162, filed Apr. 29, 2020, which is hereby incorporated by reference in its entirety.

FIELD

The present disclosure relates generally to the ground transportation of aircraft. More particularly, the present disclosure relates to systems and methods for robotically coordinating the ground transfer of aircraft for improved aerial ridesharing operations.

BACKGROUND

A wide variety of modes of transport are available within cities. For example, people can walk, ride a bike, drive a car, take public transit, or use a ride sharing service. As population densities and demand for land increase, however, many cities are experiencing problems with traffic congestion and the associated pollution. Consequently, there is a need to expand the available modes of transport in ways that can reduce the amount of traffic without requiring the use of large amounts of land.

Air travel within cities can reduce travel time over purely ground-based approaches and alleviate problems associated with traffic congestion.

Vertical takeoff and landing (VTOL) aircraft provide opportunities to incorporate aerial transportation into transport networks for cities and metropolitan areas. VTOL aircraft require much less space to take-off and land than other types of aircraft, making them more suitable for densely populated urban environments. Landing, charging, storing, and transferring VTOL aircraft, however, still presents a variety of challenges.

SUMMARY

Aspects and advantages of embodiments of the present disclosure will be set forth in part in the following description, or can be learned from the description, or can be learned through practice of the embodiments.

Aspects of the present disclosure are directed to a system for transporting an aircraft. The system can include one or more processors and one or more non-transitory computer-readable media that collectively store instructions that, when executed by the one or more processors, cause the system to perform operations. The operations can include obtaining facility data associated with a flight itinerary of the aircraft. The facility data can be indicative of at least an aerial transport facility at which the aircraft is located or to be located. The operations can include determining a robotic device of a plurality of robotic devices to transport the aircraft within a landing area of the aerial transport facility based, at least in part, on the facility data. The operations can include determining a pick-up route for the robotic device to travel within the landing area to the aircraft based, at least in part, on the facility data. And, the operations can include communicating one or more command instructions for the robotic device to travel in accordance with the pick-up route.

Another aspect of the present disclosure is directed to a method for transferring an aircraft. The method can include obtaining, by a computing system comprising one or more computing devices, facility data associated with a flight itinerary of an aircraft. The facility data can be indicative of at least an aerial transport facility. The method can include determining, by the computing system, a parking location for the aircraft based, at least in part, on the facility data. The method can include determining, by the computing system, a parking route for a robotic device physically connected to the aircraft to travel within a landing area of the aerial transport facility to the parking location based, at least in part, on the facility data. And, the method can include communicating, by the computing system, one or more command instructions for the robotic device to travel in accordance with the parking route.

Another aspect of the present disclosure is directed to a method for transferring an aircraft. The method can include obtaining, by a computing system comprising one or more computing devices, facility data associated with a flight itinerary of an aircraft. The facility data can be indicative of at least an aerial transport facility. The aircraft can be located on a landing pad of a landing area of the aerial transport facility. The method can include obtaining, by the computing system, a departure notification indicating that the aircraft is ready to take-off from the landing pad. The method can include, in response to the departure notification, communicating, by the computing system, one or more command instructions for a robotic device physically connected to the aircraft to disconnect from the aircraft. The method can include determining, by the computing system, a departure route for the robotic device to travel within the landing area based, at least in part, on the facility data. The method can include communicating, by the computing system, one or more command instructions for the robotic device to travel in accordance with the departure route. And, the method can include providing, by the computing system, a take-off notification to an aircraft device of the aircraft indicative of the progress of the robotic device along the departure route.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which:

FIG. 10 depicts a block diagram of an example computing system according to example embodiments of the present disclosure.

DETAILED DESCRIPTION

Figure 1:
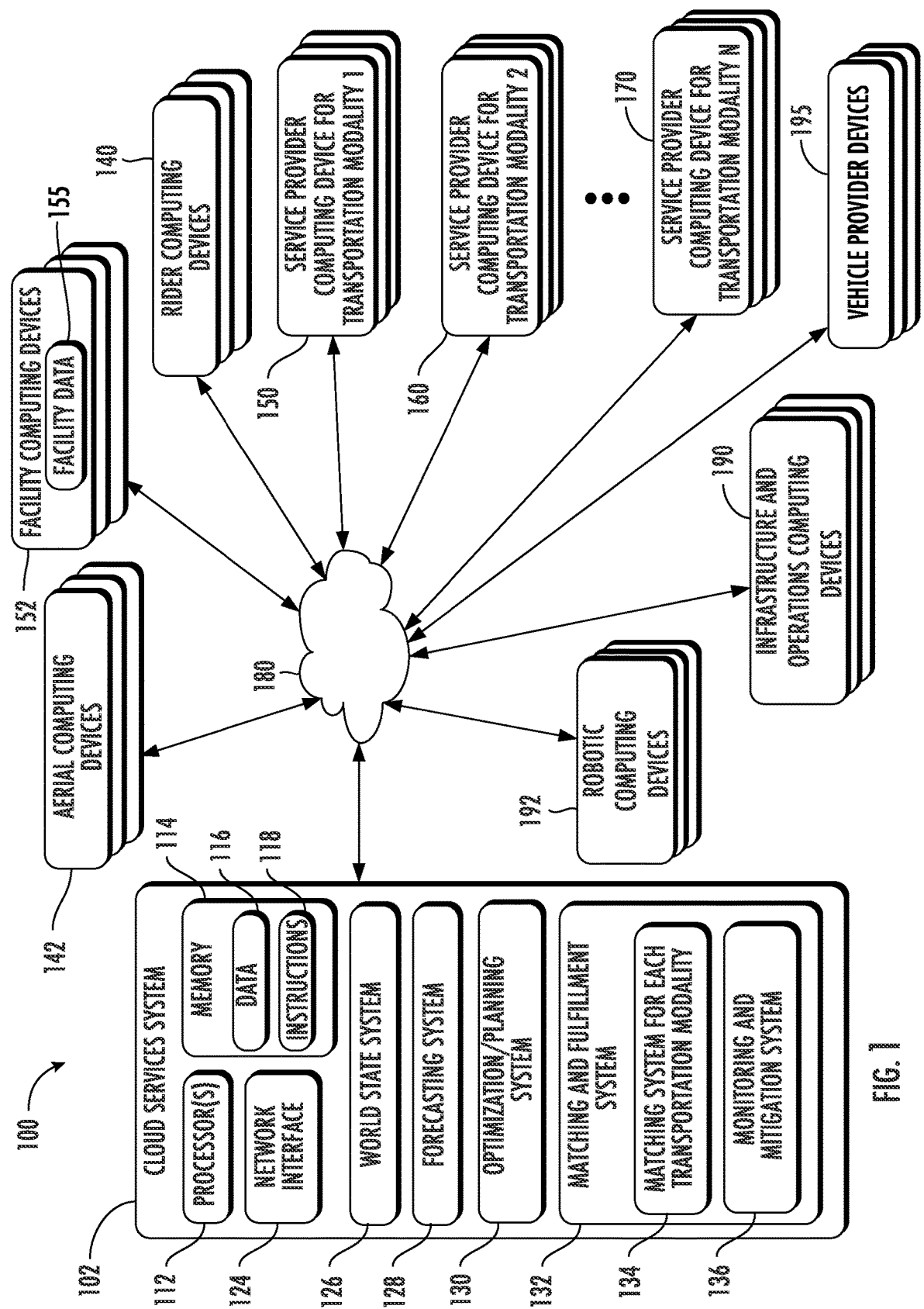
FIG. 1 depicts a block diagram of an example system according to example embodiments of the present disclosure.

Aspects of the present disclosure are directed to improved systems and methods for coordinating the ground transfer of aircraft for improved aerial ridesharing operations. In particular, aspects of the present disclosure are directed to the coordination of robotic devices at an aerial transport facility. For instance, a service entity can manage and coordinate a plurality of different types of vehicles to provide services to a plurality of users via a transportation platform. By way of example, a user may generate a service request for transportation from an origin location to a destination location via an application running on the user's device. An operations computing system associated with the service entity (e.g., a cloud-based operations computing system, etc.) can obtain data indicative of the service request and generate one or more itineraries (e.g., user itinerary, flight itinerary, etc.) to facilitate transporting the user from the origin location to the destination location. A user itinerary, for example, can be a multi-modal transportation itinerary that includes at least two types of transportation such as, for example, ground-based vehicle transportation and an aerial transportation. For example, the itinerary can include three legs: a first leg that includes a ground-based vehicle transporting a user from the origin location (e.g., a home, etc.) to a first aerial transport facility; a second leg (e.g., an aerial portion) that includes an aircraft transporting the user from the first aerial transport facility to a second aerial transport facility; and a third leg that includes another ground-based vehicle transporting the user from the second aerial transport facility to the destination location (e.g., a conference center).

The aerial transport facilities can include a plurality of aircraft that are arriving and departing at various times for a variety of different users. To accommodate the plurality of aircraft, each facility can include a landing area with one or more zones (e.g., landing pads, parking locations, travel ways, passenger walkways, aircraft maintenance areas, etc.). For instance, aircraft can land and/or take-off from a respective landing pad, park at a respective parking location, etc. The aerial transport facilities of the present disclosure can utilize a plurality robotic devices to transfer aircraft of the facility between different zones of the landing area. To do so, the robotic devices can be configured to connect to a landing gear and/or another portion of an aircraft and physically drag, pull, and/or push the aircraft within the landing area.

A computing system can coordinate the actions of the plurality of devices at an aerial transport facility to efficiently and safely transfer the plurality of aircraft that are arriving and departing from the aerial transport facility between one or more different zones of the aerial transport facility's landing area. To do so, the computing system can obtain facility data that identifies a current state of the aircraft landing area (e.g., whether the zones of the landing area (e.g., parking locations, landing pads, etc.) are currently in use, available, etc.) and a flight itinerary for an incoming aircraft that identifies an estimated arrival time, boarding time, and departure time of the aircraft. The computing system can identify a robotic device to facilitate the transfer of the aircraft based on robotic data (e.g., a location, schedule, power level, etc. of each of the plurality of robotic taxis at the aerial transport facility), the facility data, and the flight itinerary for the incoming aircraft (e.g., by determining that the robotic device is available and can safely reach the aircraft). The computing system can also obtain rider data that indicates, for example, the times at which aircraft passengers can be within the landing area, boarding an aircraft, exiting an aircraft, etc. The computing system can determine one or more routes (e.g., a first route such as a pick-up route to the aircraft, a second route such as a parking route to a parking location, a third route such as a drop-off route to a landing pad, a fourth route such as a departure route from the landing pad, etc.) for the robotic device to travel within the landing area (e.g., between one or more zones of the landing area) of the aerial transport facility based on the facility data, map data (e.g., a representation of the landing area and/or one or more prohibited/accessible areas of the landing area as identified by the facility data), and/or the rider data. For example, the computing system can generate a route for a robotic device to travel on the landing area without interfering with dynamically generated passenger walkways or other aircraft. The computing system can generate and communicate command instructions to the robotic device to cause the robotic device to travel in accordance with the one or more routes. The robotic device can travel in accordance with the one or more routes to attach to an aircraft (e.g., after completing the pick-up route), transfer the aircraft to a parking location (e.g., during the parking route), transfer the aircraft to a take-off location (e.g., during the drop-off route), and detach and recede from the aircraft (e.g., during the departure route). In this manner, the systems and methods of the present disclosure can dynamically coordinate the transfer of aircraft between zones of an aerial transport facility. Each of the one or more routes can be tailored based on the current state of the landing area (e.g., occupied/available zones, etc.) of the aerial transport facility. In this way, the computing system can enable the safe and efficient transfer of aircraft between zones of a landing area based on current information. This, in turn, can reduce the amount of downtime that an aircraft spends idle at an aerial transport facility, while increasing the safety of aircraft transfers.

More particularly, a service entity can be associated with an operations computing system (e.g., a cloud-based operations computing system, etc.) that is configured to manage, coordinate, and dynamically adjust a multi-modal transportation service via a transportation platform. The multi-modal transportation service can include a plurality of transportation legs, one of which (e.g., a second transportation leg) can include an aerial transport of a user. For example, the operations computing system can obtain a request for a transportation service. The request for the transportation service can include at least a request for an aerial transport of a user of the transportation platform. The operations computing system can obtain the request from a user device associated with the user of the transportation platform.

The request for the transportation service can include an origin location and a destination location. In some instances, unless specified otherwise, the origin of the transportation service can be assumed to be a current location of the user (e.g., as indicated by location data such as GPS data received from the user device and/or as input by the user). A user can also supply a desired destination (e.g., by typing the destination into a text field which may, for example, provide suggested completed entries while the user types).

A multi-modal transportation itinerary from the origin location to the destination location can be generated based on the request for the transportation service. The multi-modal transportation itinerary can include two or more transportation legs (e.g., a first transportation leg, a second transportation leg, a third transportation leg, etc.) between the origin location and the destination location specified in the request. The two or more transportation legs can include travel via two or more different transportation modalities such as, for example: cars, motorcycles, light electric vehicles (e.g., electric bicycles or scooters), buses, trains, aircraft (e.g., airplanes), watercraft, walking, and/or other transportation modalities. Example aircrafts can also include helicopters and other vertical take-off and landing aircraft (VTOL) such as electric vertical take-off and landing aircraft (eVTOL). The vehicles can include non-autonomous, semi-autonomous, and/or fully-autonomous vehicles.

The operations computing system can facilitate the ability of a user to receive transportation on one or more of the transportation legs included in the multi-modal transportation itinerary. As an example, the operations computing system can interact with a plurality of devices (e.g., one or more service provider devices) to match the user with one or more transportation service providers for each transportation leg of the multi-modal transportation itinerary. For example, the operations computing system can book or otherwise reserve a seat in, space on, or usage of one or more of the transportation modalities for the user. For example, the request for a transportation service can include at least an aerial transport of the user. In response, the operations computing system can determine an aerial service provider to provide the aerial transport for the user (e.g., book a seat on an aircraft of the aerial service provider).

For example, in response to a user's request, the operations computing system can utilize one or more algorithms/machine-learned models to generate a multi-modal transportation itinerary for the user. As an example, in some implementations, the operations computing system can sequentially analyze and identify potential transportation legs for each different available transportation modality. For example, a most critical, challenging, and/or supply-constrained transportation leg can be identified first and then the remainder of the multi-modal transportation itinerary can be stitched around such leg. In some implementations, the order of analysis for the different modalities can be a function of a total distance associated with the transportation service (e.g., shorter transportation services result in ground-based modalities being assessed first while longer transportation services result in flight-based modalities being assessed first). By way of example, the operations computing system can assign the user to an aircraft for the middle leg of a three-leg multi-modal itinerary and, then, book a human-driven or autonomous ground-based vehicle for a first leg of the multi-modal itinerary to take the user(s) from an origin location to a first aerial transport facility (e.g., to board the aircraft such as, for example, at an origin facility). At a later time (e.g., while the user(s) are in flight), the operations computing system can book another human-driven or autonomous ground-based vehicle to take the user(s) from a second aerial transport facility (e.g., a destination facility) to the specified destination location(s).

In this manner, the operations computing system can generate a multi-modal transportation itinerary for facilitating the aerial transportation of the multi-modal transportation service. The multi-modal transportation itinerary can include at least a first transportation leg, a second transportation leg, and a third transportation leg. An aerial service provider, for example, can be associated with the second transportation leg to provide the aerial transport to the user during the second transportation leg.

The aerial transport can include transportation between at least two an aerial transport facilities. An aerial transport facility can be located on a roof of a structure, such as a parking garage and can provide landing, take-off, and/or parking locations for one or more aircraft of an aerial service provider. The aerial transport facility can include a landing area defined by one or more edges (e.g., a boundary of a roof, parking garage, etc.). The landing area can include a plurality of zones, each zone configured to facilitate the transfer of a plurality of aircraft landing and/or taking-off from the aerial transport facility. For example, the plurality of zones can include one or more landing pads where aircraft can land and/or take-off, one or more parking locations where passengers can board and/or depart from an aircraft, one or more maintenance locations where aircraft can receive a charge, repairs, etc., one or more travel ways where aircraft can transfer from one zone to another, one or more passenger walkways where passengers can access an aircraft, etc.

A computing system (e.g., an operations computing system, aerial transport facility computing system, etc.) can be configured to control, route, monitor, and/or communicate with aircraft in the vicinity of the aerial transport facility. The computing system can be configured to determine or aid in determining respective routes for the aircraft for landing on the aerial transport facility and/or taking-off from the aircraft landing facility. In addition, or alternatively, the computing system can determine respective landing pad locations on which the aircraft can land and/or depart from.

In some implementations, the computing system can be configured to detect the location of a plurality of aircraft at the aerial transport facility. For example, the aerial transport facility can include one or more sensors configured to detect a location of the aircraft relative to the landing pad location (e.g., during approach, landing, etc.). For example, a portion of the computing system (e.g., a landing facility computing system located at the aircraft landing facility) can be operatively connected with the sensor(s) and configured to detect the presence and/or location of aircraft within the landing area of the aerial transport facility. The sensors can be any suitable type of sensor including optical, infrared, heat, radar, LIDAR, pressure, capacitive, inductive, etc.

In addition, the computing system can be configured to help facilitate the transfer of the plurality of aircraft to one or more different zones of the aerial transport facility. To do so, the aerial transport facility can include a plurality of robotic devices. Each robotic device can be configured to push, pull, drag, or otherwise move an aircraft within the landing area of the aerial transport facility. By way of example, each device can include: one or more transportation mechanisms such as one or more wheels (e.g., three wheels, etc.) and/or tracks configured to move the device; one or more linear lifting features such as, for example, one or more linear actuators, hydraulic or pneumatic cylinders, etc. configured to lift an aircraft and/or portion thereof;

and/or one or more physical connection features such as, for example, one or more locking mechanisms configured to attach to a landing gear of an aircraft.

The computing system can communicate with one or more robotic devices of the plurality of devices at the aerial transport facility to cause the one or more robotic devices to transfer aircraft between one or more different zones of the aerial transport facility. For example, each of the plurality of robotic devices can include a respective onboard robot control system that includes one or more processors and one or more memories storing computer-readable instructions that when executed by the one or more processors cause the robotic device to perform one or more operations. For example, the control system can be configured to process instructions for moving the robotic device and send control signals to various motion control systems (e.g., acceleration throttle, steering, braking, etc.) to control the motion of the robotic device. Moreover, the control system can include and/or be in communication with an onboard computing system that can navigate the robot from one location to another using onboard sensor data, map data, etc. In some implementations, the robotic devices can be capable of processing onboard sensor data to detect object(s) that may be in its path and/or to avoid colliding/interfering with object(s). In addition, each robotic device can include one or more communication interfaces. The one or more communication interfaces can include any circuits, components, software, etc. for communicating via one or more networks (e.g., LAN, MAN, WAN, wireless, internet, etc.). In this manner, each of the plurality of robotic devices can receive and execute instructions from the computing system.

In addition, or alternatively, each of the plurality of robotic devices can include one or more power sources such as, for example, one or more batteries, etc. to power the movement of the robotic device. In some implementations, the aerial transport facility can include a storage and/or charging facility to store, maintain, repair, charge, etc. the plurality of robotic devices. For instance, the plurality of robotic devices can include rechargeable electric batteries, each of which can be charged throughout the day, during the night, etc. at a charging facility of the aerial transport facility. Moreover, each of the plurality of robotic devices can include one or more positioning systems such as, for example, one or more GPS sensors, IMU sensors, RFID tags, etc. configured to determine a current location of the device (e.g., a location relative to the landing area of the aerial transport facility).

Each robotic device can be configured to automatically connect to an aircraft. For instance, a robotic device can include one or more sensors (e.g., camera, LiDAR, etc.) configured to collect robotic sensor data indicative of its surrounding environment. For instance, the sensors can include one or more vision sensors (e.g., camera(s), LIDAR sensor(s), RADAR sensors, etc.) and/or one or more other types of sensors (e.g., ultrasonic, microphone, etc.). The robotic device can be configured to detect a connection point (e.g., a front wheel, other structural point, etc.) of an aircraft based on the robotic sensor data and automatically attach to the connection point. By way of example, the robotic device can obtain sensor data indicative of a portion of an aircraft that the robotic device can physically or otherwise (e.g., magnetically) attach to. The robot control system can adjust an attachment mechanism (e.g., robotic arm, magnet, clamp, clasp, hook, etc.) to affix the attachment mechanism to the aircraft (e.g., by closing a robotic gripper or similar such mechanism onto/around the identified portion of the aircraft). In another example, the robotic device can include an onboard computing system that can include one or more models, algorithms, rules, etc. that allow it to process sensor data (e.g., image data, etc.). The robotic device can determine whether an object is in the robotic device's path (or within a certain threshold thereof) and navigate around the object by adjusting its motion through its control system, navigation system, etc. Additionally, or alternatively, the robotic device can request a new path (e.g., from another system, etc.) in response to detecting an object within its path.

The computing system can coordinate the movement of the plurality of robotic devices at the aerial transport facility based on real time data. For example, the computing system can obtain facility data associated with a flight itinerary of an aircraft. The flight itinerary can be indicative of one or more aspects of a current aerial transportation service being performed by the aircraft and/or one or more aspects of one or more subsequent aerial transportation services that the aircraft is scheduled to perform. For instance, the flight itinerary can be indicative of the aircraft's origination location (e.g., an aerial transport facility that the aircraft is approaching from), a destination location (e.g., an aerial transport facility that the aircraft is approaching or one on which the aircraft is currently landed), a flight time (e.g., the time of travel between the origination location and the destination location), a distance travelled, an estimated arrival time (e.g., an estimated time that the aircraft will land at the destination location), an estimated arrival location (e.g., a landing location at the destination location), and/or any additional aspects descriptive of a current aerial transportation service. In addition, the flight itinerary can be indicative of one or more subsequent destinations of the aircraft, an estimated departure time, an estimated departure location (e.g., a take-off location of the destination location), an estimated boarding time for passengers of a subsequent aerial transportation service, and/or any other aspects descriptive of one or more subsequent aerial transportation services.

The facility data can be indicative of at least an aerial transport facility at which the aircraft is to be located (e.g., a current destination location such as an aerial transportation facility that the aircraft is approaching for landing and/or at which the aircraft is scheduled to land). For example, the facility data can be received at a cloud services system from an aerial device of the aircraft and/or an aerial facility computing system. As another example, the facility data can be received at the aerial facility computing system from the cloud services system and/or one or more aircraft navigation systems of a plurality of aircraft at (e.g., parked, landed on, etc.) the aerial transport facility. For instance, the computing system can directly or indirectly receive this data from the plurality of aircraft, the cloud services system, etc.

The facility data can describe one or more aspects of the aerial transport facility that the aircraft is approaching, will be located, or on which the aircraft is currently located. For example, the facility data can include data descriptive of a current aerial transport facility state. The current aerial transport facility state can include state information for one or more zones of the aerial transport facility. For instance, the state information can be indicative of whether a zone of the aerial transportation facility is currently occupied, unoccupied, active (e.g., in use), inactive (e.g., not in use), etc. By way of example, the current aerial transport facility state can indicate whether each parking location of the aerial transport facility is occupied or unoccupied, whether each landing pad of the aerial transport facility is active (e.g., receiving an incoming aircraft, facilitating the take-off of an out-going aircraft, etc.) or inactive, whether each travel way of the aerial transportation facility is active (e.g., allowing aircraft to cross the landing area of the aerial transportation facility) or inactive, whether each passenger walkway of the aerial transportation facility is active (e.g., allowing passengers to cross the landing area of the aerial transportation facility) or inactive, whether each maintenance facility of the aerial transportation facility is active (e.g., servicing an aircraft) or inactive, etc.

The current aerial transport facility state can be determined based, at least in part, on facility sensors, communications between the plurality of aircraft, and/or aerial transfer data. As an example, the aerial transport facility can include one or more sensors configured to detect a location associated with each of a plurality of aircraft landing, parked, and/or taking-off from the aerial transport facility. In addition, or alternatively, each of the plurality of aircraft can be configured to communicate a location (e.g., GPS coordinates, a location relative to the landing area of the aerial transport facility, etc.) associated with the respective aircraft to the computing system. The current aerial transport facility state can be determined based on the location of the plurality of aircraft. For example, a respective zone of the landing area can be set to occupied, in use, etc. in the event that an aircraft is located within the respective zone.

As another example, the current aerial transport facility state can be determined based on aerial transfer data. For example, the facility data can include aerial transfer data indicative of one or more flight itineraries for a plurality of aircraft scheduled to land, park, or take-off from the aerial transport facility. Each respective flight itinerary of the one or more flight itineraries can indicate a landing time, boarding time, departure time, etc. for a respective aircraft at the aerial transport facility. In addition, or alternatively, the aerial transfer data can be indicative of one or more parking locations, maintenance location, etc. assignment. For instance, each assignment can be indicative of a scheduled parking/maintenance duration during which a respective aircraft is located at a respective parking location. The current aerial transport facility state can be determined based on the location (e.g., scheduled location, estimated location, etc.) of the plurality of aircraft at the landing area as identified by the aerial transfer data.

As another example, the current aerial transport facility state can be determined based on rider data. For example, the computing system can obtain rider data associated with a plurality of aircraft passengers. The plurality of aircraft passengers, for example, can include a plurality of users of an aerial service provider. The rider data can be indicative of the multi-modal transportation itineraries of passengers and/or include information on the progress of one or more passengers for each of the one or more flight itineraries. For example, the rider data can indicate an estimated time of arrival (e.g., at the aerial transport facility) for one or more passengers of an aircraft associated with the one or more flight itineraries. In some implementations, the rider data can indicate a check-in status of the one or more passengers (e.g., a ready to board the aircraft status), a boarded status (e.g., the passenger has boarded the aircraft), etc. The rider data can also indicate which passengers are assigned to which aircraft located (or to be located) at an aerial transport facility.

In some implementations, the computing system can dynamically determine one or more passenger walkways of the landing area based on the rider data. By way of example, the computing system can determine one or more boarding times (e.g., a time period during which passengers are in the progress of boarding an aircraft) and/or deboarding times (e.g., a time period during which passengers are in the progress of departing from an aircraft) for each of the one or more flight itineraries associated with the aerial transport facility (e.g., as indicated by the aerial transfer data). For instance, the computing system can determine the one or more boarding and/or deboarding times based on progress of one or more passengers assigned to an aircraft located (or to be located) at an aerial transport facility (e.g., as indicated by the rider data). The computing system can dynamically determine the one or more passenger walkways of the landing area during the one or more boarding and/or deboarding times. By way of example, each passenger walkway can include a path to and/or from an aircraft located (or to be located) at the aerial transport facility during a boarding time and/or deboarding time (e.g., as indicated by the rider data) for the respective aircraft.

In some implementations, the computing system can determine a boarding duration for an aircraft based, at least in part, on the rider data. For example, the boarding duration can include a time duration from a first passenger boarding an aircraft to a last passenger to board the aircraft. The current aerial transport facility state can be determined based on boarding duration. For example, one or more passenger walkway, travel ways, etc. of the landing area can be determined to be prohibited based on the boarding duration. As an example, a passenger walkway leading to a respective aircraft can be prohibited during a boarding duration for the respective aircraft.

The computing system can determine a robotic device of the plurality of robotic devices at the aircraft landing facility to transport the aircraft within the landing area of the aircraft landing facility. For instance, the computing system can determine the robotic device based on the facility data (e.g., the aerial transfer data, current aerial transport facility state, etc.). In addition, or alternatively, the computing system can determine the robotic device based on robotic data. For example, the computing system can obtain robotic data associated with each respective robotic device of the plurality of robotic devices. The robotic data can be indicative of a power level, type (e.g., a type of connection interface, weight limits, size limits, etc.), location (e.g., GPS data, a location relative to the landing area of the landing facility, etc.), schedule (e.g., a current state of the device (e.g., in use, available, etc.), one or more future assignments for the device (e.g., transportation assignment for the day) and/or any other characteristics associated with a respective robotic device. The computing system can determine the robotic device to transport the aircraft within the landing area of the aircraft landing facility based on a comparison of the facility data and the robotic data.

By way of example, the computing system can determine the robotic device by filtering the plurality of robotic devices by power level, type, schedule, location, etc. For example, the computing system can filter the plurality of robotic devices to identify one or more of the plurality of robotic devices that are available and capable of transporting the aircraft within the landing area. For example, the computing system can compare a respective location of the robotic device to the landing location of the aircraft (e.g., as identified by the flight itinerary) to determine that the landing location is accessible to the robotic device (e.g., not blocked by one or more occupied or active zones of the landing area). As another example, the computing system can compare a respective schedule of the robotic device to the estimated arrival time for the aircraft (e.g., as identified by the flight itinerary) to determine that the robotic device is available to transport the aircraft at the arrival time (e.g., not busy during or prior to the arrival of the aircraft).

In some implementations, the computing system can compare a respective type of the robotic device to an aircraft type of the aircraft. For example, in some implementations, the aircraft can include an aircraft type of a plurality of aircraft types. Each aircraft type can be indicative of a shape, size, weight, landing gear type, etc. of the aircraft. For instance, one or more aircraft types can include different landing gear types (e.g., skids, tracks, wheels, etc.). In such a case, the computing system can compare the robotic device (and its hardware infrastructure, ability to conform to aircraft, etc.) to the aircraft type of the aircraft to ensure that the robotic device can attach to and move the aircraft.

In addition, or alternatively, the computing system can compare a power level of each of the plurality of robotic devices to an estimated parking time associated with the aircraft. For example, the computing system can determine a parking time for the aircraft at a parking location based on the flight itinerary. For instance, the computing system can determine the parking time based on the estimated arrival time, estimated boarding time, estimated departure time, etc. By way of example, the parking time can include the time from the arrival time to the departure time. In addition, or alternatively, the parking time can be determined based on the rider data. For instance, the computing system can determine a boarding duration for the aircraft based on the rider data. In such a case, the computing system can determine the parking time for the aircraft at a parking location based on the boarding duration.

In some implementations, the robotic device can remain physically connected to the aircraft during the parking time. In such a case, the computing system can determine whether the robotic device is associated with a power level that can power the device from pick-up time, through parking time, to the departure time. For example, the computing system can determine a power level threshold based on the parking time and/or one or more aspects of the flight itinerary, facility data, and/or rider data. The power level threshold can represent a minimum power level for transferring the aircraft. The computing system can determine the robotic device to transfer the aircraft such that the robotic device is associated with a power level higher than the minimum power level. Additionally, or alternatively, the computing system can determine which robotic device to assign to transfer an aircraft based at least in part on the power level of the robotic device. By way of example, the computing system can determine whether the robotic device has a sufficient charge level to be able to tow an aircraft from a landing pad to a parking area, charging areas, etc.

The computing system can access map data indicative of the landing area of the aerial transport facility. The map data can identify one or more accessible areas of the landing area and/or one or more prohibited areas of the landing area. For example, the map data can include a representation of the landing area defined by one or more edges. By way of example, the map data can include a representation of the edges of the landing area, the location of one or more parking locations, landing pads, travel ways, passenger walkways, etc. and/or the area therebetween. The map data can be predetermined (e.g., preloaded by an engineer, etc.) based on the aerial transport facility. For example, the map data can be different for each aerial transport facility based on the layout of the landing area of the aerial transport facility. The one or more prohibited areas and/or accessible areas of the map data can be predetermined and/or dynamically determined.

For example, the one or more prohibited areas can include one or more edges of the landing area, one or more parking locations, landing pads, travel ways, passenger walkways, etc. Each of the one or more prohibited areas can be determined based on the facility data. For example, the prohibited areas can be determined based on the current state of the aircraft landing area. By way of example, each of the one or more parking locations, landing pads, travel ways, passenger walkways, etc. of the landing area can be determined to be prohibited based on the current state of the aircraft landing area. For instance, a parking location can be prohibited in the event that the parking location is currently occupied (e.g., as identified by the current state of the aircraft landing area), etc. In this manner, the computing system can dynamically determine the one or more prohibited areas of the landing pad based on the current information as indicated by the facility data, the rider data, etc. For instance, the prohibited areas can change over time based on the rider data and the aerial transfer data. For example, the one or more passenger walkways, the occupancy of one or more landing areas, parking areas, etc. can change throughout the day based on the rider data (e.g., boarding times, deboarding time determined from the rider data), facility data (e.g., currently occupied areas determined from the facility data), aerial transfer data (e.g., soon to be occupied areas determined from the aerial transfer data), etc.

In some implementations, the map data can include a representation of the landing area with one or more geofences indicative of the one or more prohibited areas. For example, each prohibited area of the landing area can be outlined by a geofence. Each geofence, for example, can be dynamically assigned to a prohibited area of the landing area as one or more prohibited areas are determined for the landing area. The computing system can monitor the movement of each of the plurality of robotic devices and trigger a respective robotic device avoid the one or more dynamically assigned geofences. In addition, or alternatively, the robotic device can have access to the map data and can be configured to automatically stop, turn around, and/or otherwise avoid the one or more geofenced areas. In this manner, the landing location of the aircraft can be accessible to the robotic device in the event that the robotic device is not blocked by one or more prohibited areas (e.g., as identified by the one or geofences) of the landing area (e.g., as represented by the map data).

The computing system can determine a plurality of routes for each of the plurality of robotic devices based on the facility data, map data, robotic data, etc. Each route can include a travel path within the landing area of the aerial facility. For instance, the routes can include a dead-head route to position a respective robotic device at one or more locations of the landing area, a pick-up route for the robotic device to pick-up an aircraft, a parking route for the robotic device to transfer the aircraft to a parking location, a drop-off route for the robotic device to drop-off an aircraft, a departure route for the robotic device to leave an aircraft, etc. The plurality of routes can be determined such that the robotic devices avoid one or more prohibited areas of the landing area of the aerial transport facility.

For instance, the computing system can determine a first route (e.g., a pick-up route) for the robotic device to travel within the landing area to the aircraft based, at least in part, on the facility data, map data, aerial transfer data, rider data, etc. For example, the computing system can determine the pick-up route for the robotic device to travel within the landing area of the aerial transport facility based, at least in part, on the map data (e.g., as updated based on the current state of the aircraft landing area as determined based on the aerial transfer data, rider data, etc.) and the landing location for the aircraft. For instance, the pick-up route can include a route within the landing area of the aircraft facility that avoids the one or more prohibited areas of the landing area as represented by the map data.

The computing system can generate one or more command instructions based on the pick-up route and communicate the one or more command instructions to the robotic device. The robotic device can receive the one or more command instructions and travel in accordance with the pick-up route to the arrival location (e.g., a landing pad of the landing area) of the aircraft. The robotic device can be configured to physically connect to the aircraft (e.g., a landing gear of the aircraft) after reaching the arrival location. For example, the computing system can instruct (e.g., via one or more command instructions) the robotic device to connect to the aircraft after the robotic device reaches the arrival location.

In addition, or alternatively, the robotic device can automatically connect to a landing gear of the aircraft for transporting aircraft within the landing area after reaching the arrival location. By way of example, the arrival location can include a landing pad of the landing area. The landing pad can include an outside perimeter (e.g., a safe distance from a landing aircraft) and an interior perimeter (e.g., an area within the landing pad that the aircraft lands). In some implementations, the pick-up route can direct the robotic device to the outside perimeter. The robotic device can automatically connect to the aircraft by obtaining robotic sensor data from the one or more robotic sensors of the robotic device. The robotic device can identify a landing gear location corresponding to the landing gear of the aircraft within the interior perimeter of the landing pad based on the robotic sensor data. And, the robotic device can connect to the landing gear of the aircraft based on the landing gear location.

In some implementations, the computing system and/or the robotic device can obtain a landing notification indicating that the aircraft has landed at the landing area (e.g., within the interior perimeter) of the aerial facility. The computing system and/or the robotic device can receive the landing notification from one or more sensors of the aerial transport facility (e.g., sensing that an object has touched down on the landing pad). In some implementations, the computing system can receive sensor data indicating that the aircraft has landed at the aerial transport facility, and in response generate and provide the landing notification to the robotic device.

In addition, or alternatively, the computing system and/or the robotic device can receive the landing notification from the aircraft. By way of example, the aircraft can include one or more aerial devices (e.g., a pilot device, a vehicle computing system, etc.) including one or more processors and one or more memories. The one or more memories can include one or more non-transitory computer-readable media that collectively store instructions that, when executed by the one or more processors, cause the device to perform operations. In some implementations, the aerial devices can detect that the aircraft has landed (e.g., via pilot input, sensor data indicative of touching down, etc.) and generate and provide the landing notification to the computing system and/or the robotic device.

In some implementations, the robotic device can connect to the landing gear of the aircraft based on the landing notification. For instance, the robotic device can park at the exterior perimeter of the landing pad (e.g., FATO) until a landing notification is received. In response to receiving the landing notification, the robotic device can enter the interior perimeter of the landing pad and automatically connect (e.g., using robotic sensor data) to the landing gear of the aircraft. In addition, or alternatively, the computing system can, in response to receiving the landing notification, communicate one or more command instructions to the robotic device to connect to the landing gear of the aircraft.

The computing system can determine a parking location (e.g., one or more parking locations of the aerial transport facility) for the aircraft. In some implementations, the parking location can be predetermined. For example, the flight itinerary can include an assigned parking location for the aircraft at the aerial transport facility. In addition, or alternatively, the computing system can determine the parking location based, at least in part, on the facility data (e.g., the aerial transfer, rider data, etc.). For example, the parking location can be determined in real time based on the current aerial transport facility state (e.g., at one or more available parking locations of the landing area of the aerial transport facility).

The computing system can determine a second route (e.g., a parking route) for the robotic device (e.g., now physically connected to the aircraft) to travel within a landing area of the aerial transport facility to the parking location. For example, the computing system can determine the parking route based, at least in part, on the facility data and/or the map data. For example, the computing system can determine the parking route for the robotic device to travel within the landing area of the aerial transport facility based, at least in part, on the map data (e.g., as updated based on the current state of the aircraft landing area), the landing location for the aircraft, and the parking location for the aircraft. For instance, the parking route can include a route within the landing area of the aircraft facility that avoids the one or more prohibited areas of the landing area as represented by the map data and determined based on the aerial transfer data (e.g., to avoid one or more prohibited area), rider data (e.g., to avoid one or more walkways during boarding or deboarding), etc.

In some implementations, the computing system can obtain an attached notification indicating that the robotic device has attached to the landing gear of the aircraft. For example, robotic device can be configured to detect an attachment to the aircraft (e.g., via robotic sensor data) and, in response, transmit the attached notification to the computing system. In addition, or alternatively, the one or more aerial devices can detect the attachment and, in response, transmit the attached notification to the computing system and/or the robotic device. In some implementations, the parking location and/or the parking route can be determined in response to the attached notification.

The computing system can generate one or more command instructions based on the parking route and communicate the one or more command instructions to the robotic device. The robotic device can receive the one or more command instructions and travel in accordance with the parking route to the parking location (e.g., a parking location of the landing area). The robotic device can be configured to physically drag, pull, and/or push the aircraft (e.g., a landing gear of the aircraft) to the parking location. In this manner, the aircraft can be transferred from the landing pad to a parking location by the robotic device. The aircraft can remain parked at the parking location for one or more aerial service provider actions such as, for example, allowing one or more passengers to exit/board the aircraft (e.g., during a boarding duration, etc.), charging the aircraft for another service, and/or performing maintenance on the aircraft.

In some implementations, the robotic device can disconnect from the aircraft (e.g., to service one or more other aircraft of the aerial transport facility). For instance, the computing system can determine that the robotic device can disconnect based on the flight itinerary (e.g., a long parking time, a need for maintenance, etc.) of the aircraft, rider data (e.g., a long boarding time, etc.), aerial transfer data, facility data, etc. The computing system can communicate one or more command instructions for the robotic device physically connected to the aircraft to disconnect from the aircraft based, at least in part, on the determination. For example, the computing system can communicate one or more command instructions to the robotic device to trigger the robotic device to disconnect from the aircraft.

In some implementations, the computing system and/or robotic device can obtain a disconnect notification (e.g., from the pilot device, facility device, etc.) indicating that the aircraft requires an additional parking time (e.g., overnight parking, maintenance parking, etc.). In response to the disconnect notification, the computing system can communicate the one or more command instructions for the robotic device physically connected to the aircraft to disconnect from the aircraft. In addition, or alternatively, the robotic device can receive the disconnect notification and, in response, automatically disconnect from the aircraft.

The computing system can determine a third route (e.g., a drop-off route) for the robotic device to travel within the landing area to another landing pad of the aircraft landing facility to allow the aircraft to take-off. In some implementations, the drop-off route can be determined based on an estimated departure time of the aircraft (e.g., as identified by the flight itinerary). For example, the computing system can determine the drop-off route based, at least in part, on the facility data and/or the map data. By way of example, the computing system can determine the drop-off route for the robotic device to travel within the landing area of the aerial transport facility based on the map data as updated based on a future state of the aircraft landing area at the estimated departure time, the parking location for the aircraft, and the other landing pad. For instance, the parking route can include a route within the landing area of the aircraft facility that avoids the one or more prohibited areas of the landing area at or before the departure time.

In some implementations, the computing system can obtain a boarded notification indicating that the aircraft is ready to leave the parking location. For example, the one or more aerial devices can detect that a boarding process of the aircraft has been completed. In response, the one or more aerial devices can transmit the boarded notification to the computing system and/or the robotic device. In some implementations, the drop-off route can be determined in response to the boarded notification. For example, the computing system can determine the drop off route for the robotic device to travel within the landing area to a landing pad of the aircraft landing facility based on the boarded notification. For example, the drop-off route can be determined in response to the boarded notification.

The computing system can generate one or more command instructions based on the drop-off route and communicate the one or more command instructions to the robotic device. The robotic device can receive the one or more command instructions and travel in accordance with the drop-off route to the other landing pad (e.g., a landing pad of the landing area). The robotic device can be configured to physically drag, pull, and/or push the aircraft (e.g., a landing gear of the aircraft) to the other landing pad. The aircraft can prepare for take-off at the other landing pad.

The computing system can determine a fourth route (e.g., a departure route) for the robotic device to travel within the landing area based on the facility data, map data, etc. The departure route, for example, can include a dead-head route, for example, to another location of the landing area. The departure route can include a route to another aircraft (e.g., to service the other aircraft) landing at one or more landing pads of the landing area and/or parked at one or more parking locations of the landing area. In addition, or alternatively, the departure route can be determined based on robotic data. For instance, the departure route can include a route to a storage and/or charging facility of the aerial transport facility, for example, in the event that the power level of the robotic device is below a servicing threshold (e.g., an average power level for servicing an aircraft). Moreover, in some implementations, the computing system can determine the departure route for the robotic device to travel within the landing area based on the second landing pad. By way of example, the departure route can include a route from the interior perimeter of the landing pad to the exterior perimeter of the landing pad. In this manner, the robotic device can be configured to move a safe distance away from the aircraft before take-off.

The robotic device can disconnect from the aircraft and begin the departure route. In some implementations, the robotic device can automatically disconnect from the aircraft upon the completion of the drop-off route. In addition, or alternatively, the computing system can communicate one or more command instructions for the robotic device physically connected to the aircraft to disconnect from the aircraft after the completion of the drop-off route. For example, the computing system can communicate one or more command instructions to the robotic device to trigger the robotic device to disconnect from the aircraft.

In some implementations, the computing system and/or robotic device can obtain a departure notification indicating that the aircraft is ready to take-off from the landing pad (e.g., from pilot/aircraft device). In response to the departure notification, the computing system can communicate the one or more command instructions for the robotic device physically connected to the aircraft to disconnect from the aircraft. In addition, or alternatively, the robotic device can receive the departure notification and, in response, automatically disconnect from the aircraft.

In some implementations, the computing system and/or robotic device can provide a take-off notification to the aircraft device indicative of the progress of the robotic device along the route. For example, the take-off notification can indicate that the robotic device is a safe distance (e.g., the exterior perimeter of the landing pad) away from the aircraft. By way of example, the computing system and/or the robotic device can obtain a location corresponding to the robotic device. The computing system and/or the robotic device can compare the location to a take-off safety threshold (e.g., as indicated by an exterior perimeter). The computing system and/or the robotic device can provide the take-off notification to the aircraft device in response to determining that the location is past the take-off safety threshold.

Example aspects of the present disclosure can provide a number of improvements to computing technology such as, for example, aerial transportation computing technology. For instance, the systems and methods of the present disclosure provide an improved approach for transferring aircraft of an aerial transportation service. For example, a computing system can obtain facility data associated with a flight itinerary of an incoming aircraft. The facility data can be indicative of the aerial transport facility at which the aircraft is to be location. The computing system can determine a robotic device of a plurality of robotic devices at the aerial transport facility to transport the aircraft within a landing area of the aerial transport facility based on the facility data. The computing system can determine a route for the robotic device to travel within the landing area to the aircraft based on the facility data. The computing system can communicate one or more command instructions for the robotic device to travel in accordance with the route. In this manner, the present disclosure presents an improved computing system that can effectively monitor current information about an aircraft facility and coordinate the transfer of aircraft at the facility based on the current information. For example, the computing system employs improved devices within an aircraft facility that can automatically connect with an aircraft and transfer the aircraft within the facility. The computing system can accumulate and utilize newly available information such as, for example, facility data such as a current aerial transport facility state and robotic data such as respective power levels to dynamically routes within a landing area of the aircraft facility. In this way, the computing system provides a practical application that enables an aircraft facility to efficiently transfer aircraft during a portion of a transportation service. The computer-implemented techniques disclosed herein result in routes that can change depending on the time and circumstances of an aerial transportation service. Ultimately, this can lead to less aircraft downtime, an increase aircraft usage, and lighter aircraft, as the separating functionality from the aircraft can reduce it weight. All of this can result in a more efficient use of the aircraft's onboard resources (e.g., power resources, processing resources, data resources, etc.).

With reference now to FIGS. 1-10, example embodiments of the present disclosure will be discussed in further detail. FIG. 1 depicts a block diagram of an example system 100 according to example embodiments of the present disclosure. The system 100 can include a cloud services system 102 that can operate to control, route, monitor, and/or communicate with aircraft (e.g., VTOL aircraft). These operations can be performed as part of a multi-modal transportation service for passengers, for example, including travel by ground vehicle and travel by aircraft (e.g., VTOL aircraft).

The cloud services system 102 can be communicatively connected over a network 180 to one or more rider computing devices 140, one or more service provider computing devices 150 for a first transportation modality, one or more service provider computing devices 160 for a second transportation modality, one or more service provider computing devices 170 for an Nth transportation modality, and one or more infrastructure and operations computing devices 190. In addition, the cloud services system 102 can be communicatively connected over the network 180 to one or more robotic computing devices 192, one or more aerial computing devices 142, and/or one or more facility computing devices 152. In some implementations, the one or more facility computing device 152 can store and/or associated with facility data 155.

Each of the computing devices 140, 142, 150, 152, 160, 170, 190, 192 can include any type of computing device such as a smartphone, tablet, hand-held computing device, wearable computing device, embedded computing device, navigational computing device, vehicle computing device, laptop, desktop, personal computer, etc. A computing device can include one or more processors and a memory (e.g., similar to as will be discussed with reference to processors 112 and memory 114). Although service provider devices are shown for N different transportation modalities, any number of different transportation modalities can be used, including, for example, less than the three illustrated modalities (e.g., one or more modalities can be used).

The cloud services system 102 includes one or more processors 112 and a memory 114. The one or more processors 112 can be any suitable processing device (e.g., a processor core, a microprocessor, an ASIC, a FPGA, a controller, a microcontroller, etc.) and can be one processor or a plurality of processors that are operatively connected. The memory 114 can include one or more non-transitory computer-readable storage media, such as RAM, ROM, EEPROM, EPROM, one or more memory devices, flash memory devices, etc., and combinations thereof.

The memory 114 can store information that can be accessed by the one or more processors 112. For instance, the memory 114 (e.g., one or more non-transitory computer-readable storage mediums, memory devices) can store data 116 that can be obtained, received, accessed, written, manipulated, created, and/or stored. In some implementations, the cloud services system 102 can obtain data from one or more memory device(s) that are remote from the system 102.

The memory 114 can also store computer-readable instructions 118 that can be executed by the one or more processors 112. The instructions 118 can be software written in any suitable programming language or can be implemented in hardware. Additionally, or alternatively, the instructions 118 can be executed in logically and/or virtually separate threads on processor(s) 112. For example, the memory 114 can store instructions 118 that when executed by the one or more processors 112 cause the one or more processors 112 to perform any of the operations and/or functions described herein.

The cloud services system 102 can include a number of different systems such as a world state system 126, a forecasting system 128, an optimization/planning system 130, and a matching and fulfillment system 132. The cloud services system 102 can be associated with a transportation network provider and/or a transportation platform. The transportation network provider can be an entity that coordinates, manages, etc. transportation services that include aerial and/or other types of vehicles. In some implementations, the vehicles used to provide the transportation service can be owned, operated, leased, etc. by the transportation network provider.

The matching and fulfillment system 132 can include a different matching system 134 for each transportation modality and a monitoring and mitigation system 136. Each of the systems 126-136 can be implemented in software, firmware, and/or hardware, including, for example, as software which, when executed by the processors 112 cause the cloud services system 102 to perform desired operations. The systems 126-136 can cooperatively interoperate (e.g., including supplying information to each other).

The world state system 126 can operate to maintain data descriptive of a current state of the world. For example, the world state system 126 can generate, collect, and/or maintain data descriptive of predicted passenger demand; predicted service provider supply; predicted weather conditions; planned itineraries; pre-determined transportation plans (e.g., flight plans) and assignments; current requests; current ground transportation service providers; current transportation node operational statuses (e.g., including recharging or re-fueling capabilities); current aircraft statuses (e.g., including current fuel or battery level); current aircraft pilot statuses; current flight states and trajectories; current airspace information; current weather conditions; current communication system behavior/protocols; and/or the like. The world state system 126 can obtain such world state information through communication with some or all of the devices 140, 142, 150, 152, 160, 170, 190, 192.

For example, rider computing devices 140 can provide current information about passengers. Rider computing devices 140, for instance, can include one or more user device associated with a passenger of one or more service providers. The rider computing devices 140, can monitor the progress of a respective passenger and provide current information about the passenger to the world state system 126. Devices 142, 150, 160, and 170 can provide current information about service providers and/or aircraft utilized by service providers. Infrastructure and operations computing devices 190 can provide current information about the status of infrastructure and associated operations/management.

In addition, or alternatively, the facility computing devices 152 can provide current information (e.g., facility data 155) about an aerial transport facility. A facility computing device 152, for example, can be associated with an aerial transport facility. The facility computing device 152 can monitor current information of the aerial transport facility and provide the current information to the world state system 126. In some implementations, the facility computing devices 152 can be included in the cloud services system 102 and/or one or more functions/systems of the cloud services computing system 102 can be included in the landing facility computing system 152.

In addition, in some implementations, the system 100 can include one or more robotic computing device 192. As discussed in more detail with reference to FIGS. 3-4, the robotic computing devices 192 can be configured to transfer one or more aircraft at an aerial transport facility. The devices 192 can monitor current transfer information at a respective facility and provide the current information to the world state system 126.

In some implementations, the system 100 can include one or more vehicle provider devices 195. The vehicle provider device(s) 195 can be associated with one or more vehicle providers. A vehicle provider can be an entity that operates, owns, leases, controls, manufactures, etc. one or more vehicles. For example, a vehicle provider can include an operator of a fleet of aircraft. A vehicle provider can put one or more aircraft online with the transportation network provider and/or platform to make them available to provide a transportation service. As described herein, the cloud services system 102 can coordinate the available aircraft to provide a transportation service (e.g., a multi-modal transportation service, etc.). In some implementations, the vehicle providers can be third-party entities that are different than the transportation network provider associated with the cloud services system 102. In some implementations, the transportation network provider can also be a vehicle provider.

The aircraft available for transportation services can include one or more types of vehicles. For example, each vehicle provider can provide a different type of aircraft (e.g., VTOL, helicopter, etc.) and/or a different model of aircraft. In some implementations, a vehicle provider can provide more than one type, version, model, etc. of aircraft available for the cloud services system 102 and the transportation network provider. The different types of aircraft can include different shapes, sizes, capacities, capabilities, autonomy abilities (e.g., autonomous, semi-autonomous, manual, etc.), landing gear, hardware, etc.

The forecasting system 128 can generate predictions of the demand and supply for transportation services at or between various locations over time. The forecasting system 128 can also generate or supply weather forecasts. The forecasts made by the system 128 can be generated based on historical data and/or through modeling of supply and demand. In some instances, the forecasting system 128 can be referred to as an RMR system, where RMR refers to "routing, matching, and recharging." The RMR system can be able to simulate the behavior of a full day of activity across multiple ride share networks.

The optimization/planning system 130 can generate transportation plans for various transportation assets and/or can generate itineraries for passengers. For example, the optimization/planning system 130 can perform flight planning. As another example, optimization/planning system 130 can plan or manage/optimize itineraries which include interactions between passengers and service providers across multiple modes of transportation.

The matching and fulfillment system 132 can match a passenger with a service provider for each of the different transportation modalities. For example, each respective matching system 134 can communicate with the corresponding service provider computing devices 150, 160, 170 via one or more APIs or connections. Each matching system 134 can communicate trajectories and/or assignments to the corresponding service providers. Thus, the matching and fulfillment system 132 can perform or handle assignment of ground transportation, flight trajectories, take-off/landing, etc.

For example, the one or more aerial computing devices 142 can include a service provider device 150, 160, 170 associated with an aircraft. The aerial computing devices 142 can include, for instance, a user computing device associated with a pilot of the aircraft, a vehicle computing device associated with the aircraft, etc. For instance, the aircraft can include an autonomous aircraft with a vehicle computing system (e.g., aerial computing device 142) configured to facilitate the movement of the aircraft.

The monitoring and mitigation system 136 can perform monitoring of user itineraries and can perform mitigation when an itinerary is subject to significant delay (e.g., one of the legs fails to succeed). Thus, the monitoring and mitigation system 136 can perform situation awareness, advisories, adjustments and the like. The monitoring and mitigation system 136 can trigger alerts and actions sent to the devices 140, 142, 150, 152, 160, 170, 190, and 192. For example, passengers, service providers, aircraft, and/or operations personnel can be alerted when a certain transportation plan has been modified and can be provided with an updated plan/course of action. Thus, the monitoring and mitigation system 136 can have additional control over the movement of aircraft, ground vehicles, pilots, and passengers.

In some implementations, the cloud services system 102 can also store or include one or more machine-learned models. For example, the models can be or can otherwise include various machine-learned models such as support vector machines, neural networks (e.g., deep neural networks), decision-tree based models (e.g., random forests), or other multi-layer non-linear models. Example neural networks include feed-forward neural networks, recurrent neural networks (e.g., long short-term memory recurrent neural networks), convolutional neural networks, or other forms of neural networks.

In some instances, the service provider computing devices 150, 160, 170 can be associated with autonomous vehicles (e.g., autonomous VTOL aircraft). Thus, the service provider computing devices 150, 160, 170 can provide communication between the cloud services system 102 and an autonomy stack of the autonomous vehicle which autonomously controls motion of the autonomous vehicles.

The infrastructure and operations computing devices 190 can be any form of computing device used by or at the infrastructure or operations personnel including, for example, devices configured to perform passenger security checks, luggage check in/out, re-charging/re-fueling, safety briefings, vehicle check in/out, and/or the like.

The network(s) 180 can be any type of network or combination of networks that allows for communication between devices. In some embodiments, the network(s) can include one or more of a local area network, wide area network, the Internet, secure network, cellular network, mesh network, peer-to-peer communication link and/or some combination thereof and can include any number of wired or wireless links. Communication over the network(s) 180 can be accomplished, for instance, via a network interface using any type of protocol, protection scheme, encoding, format, packaging, etc.

The system 100 can be configured to facilitate the transfer (e.g., automatic transfer) of an aircraft. For example, the aerial computing devices 142, the facility computing devices 152, and/or the robotic charging devices 192 can be configured to perform one or more operations described herein, for example, as described below with reference to the remaining FIGS to transfer an aircraft within a landing area of aerial transport facility to facilitate a multi-modal transportation service.

For example, the cloud services system 102 can be configured to manage, coordinate, and dynamically adjust a multi-modal transportation service via a transportation platform. The multi-modal transportation service can include a plurality of transportation legs, one of which (e.g., a second transportation leg) can include an aerial transport of a user. For example, the cloud services system 102 can obtain a request for a transportation service (e.g., from a rider computing device 140). The request for the transportation service can include at least a request for an aerial transport of a user of the transportation platform. The cloud services system 102 can obtain the request from a user device (e.g., a rider computing device 140) associated with the user of the transportation platform.

The request for the transportation service can include an origin location and a destination location. In some instances, unless specified otherwise, the origin of the transportation service can be assumed to be a current location of the user (e.g., as indicated by location data such as GPS data received from a rider computing device 140 and/or as input by the user). A user can also supply a desired destination (e.g., by typing the destination into a text field which may, for example, provide suggested completed entries while the user types).

A multi-modal transportation itinerary from the origin location to the destination location can be generated based on the request for the transportation service. The multi-modal transportation itinerary can include two or more transportation legs (e.g., a first transportation leg, a second transportation leg, a third transportation leg, etc.) between the origin location and the destination location specified in the request. The two or more transportation legs can include travel via two or more different transportation modalities such as, for example: cars, motorcycles, light electric vehicles (e.g., electric bicycles or scooters), buses, trains, aircraft (e.g., airplanes), watercraft, walking, and/or other transportation modalities. Example aircrafts can also include helicopters and other vertical take-off and landing aircraft (VTOL) such as electric vertical take-off and landing aircraft (eVTOL). The vehicles can include non-autonomous, semi-autonomous, and/or fully-autonomous vehicles.

The cloud services system 102 can facilitate the ability of a user to receive transportation on one or more of the transportation legs included in the multi-modal transportation itinerary. As an example, the cloud services system 102 can interact with a plurality of devices (e.g., one or more service provider devices 150, 160, 170, one or more facility computing device 152, one or more aerial computing devices 142, one or more robotic computing devices 192, one or more infrastructure computing devices 190, vehicle provider devices 195, etc.) to match the user with one or more transportation service providers for each transportation leg of the multi-modal transportation itinerary. For example, the cloud services system 102 can book or otherwise reserve a seat in, space on, or usage of one or more of the transportation modalities for the user. For example, the request for a transportation service can include at least an aerial transport of the user. In response, the cloud services system 102 can determine an aerial service provider to provide the aerial transport for the user (e.g., book a seat on an aircraft of the aerial service provider).

For example, in response to a user's request, the cloud services system 102 can utilize the one or more algorithms/machine-learned models to generate a multi-modal transportation itinerary for the user. As an example, in some implementations, the cloud services system 102 can sequentially analyze and identify potential transportation legs for each different available transportation modality. For example, a most critical, challenging, and/or supply-constrained transportation leg can be identified first and then the remainder of the multi-modal transportation itinerary can be stitched around such leg. In some implementations, the order of analysis for the different modalities can be a function of a total distance associated with the transportation service (e.g., shorter transportation services result in ground-based modalities being assessed first while longer transportation services result in flight-based modalities being assessed first). By way of example, the cloud services system 102 can assign the user to an aircraft for the middle leg of a three-leg multi-modal itinerary and, then, book a human-driven or autonomous ground-based vehicle for a first leg of the multi-modal itinerary to take the user(s) from an origin location to a first aerial transport facility (e.g., to board the aircraft such as, for example, at an origin facility). At a later time (e.g., while the user(s) are in flight), the cloud services system 102 can book another human-driven or autonomous ground-based vehicle to take the user(s) from a second aerial transport facility (e.g., a destination facility) to the specified destination location(s).

In some implementations, the seat availability, schedule, aerial routes, aircraft itineraries, and/or other information associated with an aircraft can be provided by a vehicle provider device 195 to the cloud services system 102. The cloud services systems 102 can generate an itinerary for a user based at least in part on this information. For example, a vehicle provider device 195 can provide a schedule of candidate aerial flights or routes. The candidate aerial flights or routes may be scheduled or tentatively planned. The cloud services systems 102 can select from the candidate aerial flights or routes provided by the vehicle provider device(s) 195 when generating an itinerary for a user. For example, the cloud services system 102 can select a scheduled aerial flight associated with an aircraft that has an available seat for the user and would allow for the user to arrive at the desired destination in the preferred time constraints. The cloud services system 102 can then identify ground transportation to and/or from the aircraft (e.g., for a first and/or third transportation leg, etc.) to generate a multi-modal itinerary for the user. In this way, a vehicle provider can provide information for the aerial leg (e.g., the second or middle leg, etc.) of a multi-modal itinerary (e.g., three leg multi-modal service, etc.).

In this manner, the cloud services system 102 can generate a multi-modal transportation itinerary for facilitating the aerial transportation of the multi-modal transportation service. The multi-modal transportation itinerary can include at least a first transportation leg, a second transportation leg, and a third transportation leg. An aerial service provider, for example, can be associated with the second transportation leg to provide the aerial transport to the user during the second transportation leg from a first aerial transport facility to a second aerial transport facility.

Figure 2:
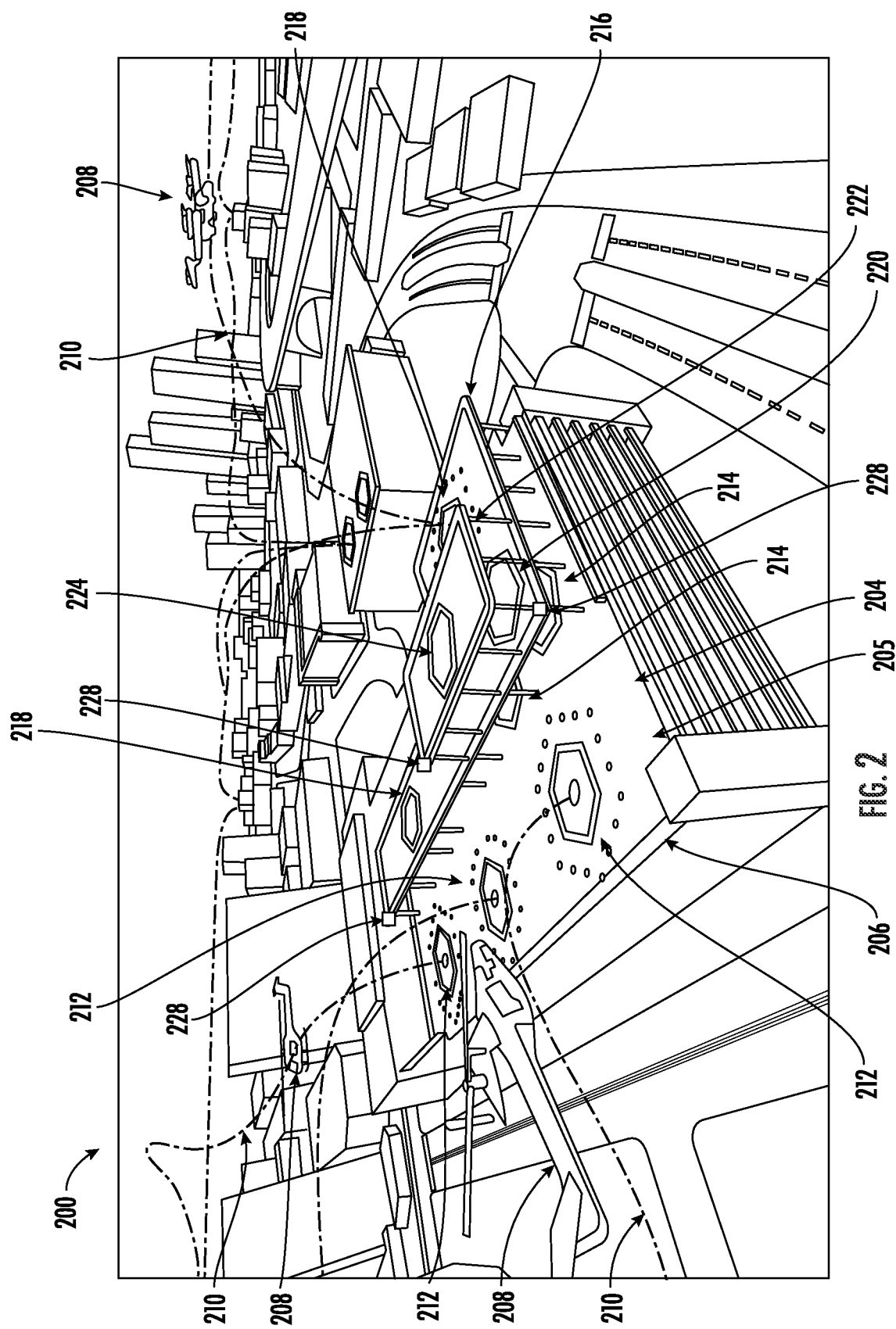
FIG. 2 is a perspective view of one embodiment of an aerial transport facility according to aspects of the present disclosure.

FIG. 2 illustrates an example embodiment of an aerial transport facility 200 in an urban environment according to aspects of the present disclosure. The aerial transport facility 200 can be located on a roof 204 of a structure 206, such as a parking garage. The aerial transport facility 200 can provide landing and/or take-off locations for one or more aircraft 208 (e.g., vertical take-off and landing (VTOL) aircraft) of a multi-modal transportation service.

The aerial transport facility 202 can include a lower level 205, which can include the roof 204 of the structure 206 and/or a platform supported on the roof 204 of the structure 206. The lower level 205 can include a lower landing area including one or more landing pads 212 and a storage area that includes one or more lower storage locations 214. The aerial transport facility 202 can include an upper level 216 that is supported over at least a portion of the lower level 205. For example, the upper level 216 can be located over one or more of the lower storage locations 214. The upper level 216 can have one or more upper landing pads 218 within an upper landing area and one or more storage locations 220 within an upper storage area. An additional level 222 can be arranged over the storage location(s) 220 of the upper level 216. The additional level 222 can include an emergency landing pad 224 within an emergency landing area 226. However, it should be understood that, in some embodiments, the aerial transport facility 202 can be free of any additional levels above the upper level 216.

A computing system such as, for example, the computing system 100, the cloud services system 102, the facility computing devices 152, etc. as described with reference to FIG. 1, can be configured to control, route, monitor, and/or communicate with aircraft in the vicinity of the aerial transport facility 202, for example as described herein. The computing system can be configured to determine or aid in determining respective routes 210 for the aircraft 208 for landing on the aerial transport facility 202 and/or taking-off from the aerial transport facility 202. The computing system can determine a respective landing pad on which the aircraft 208 can land.

In some embodiments, one or more sensors 228 can be configured to detect a location of the aircraft 208 relative to the landing pad (e.g., during approach, landing, taxing, or storage). For example, a portion of the computing system (e.g., facility computing devices 152 located at the aerial transport facility 200) can be operatively connected with the sensor(s) 228 and configured to detect the presence and/or location of aircraft 208 within the landing areas, within the storage areas, during approach and/or during takeoff. The sensors 228 can be any suitable type of sensor including optical, infrared, heat, radar, LIDAR, pressure, capacitive, inductive, etc. As illustrated, the sensors 228 can be mounted on the upper level 216 or additional level 222. However, in other embodiments, the sensors 228 can be mounted within the lower level 205 and/or upper level 216, for example as capacitive sensors to detect the presence/location of the aircraft 208 in the lower level 302 and/or upper level.

Although the examples used herein discuss the movement of aircraft and robotic devices within a landing area, parking area, etc. of a transport facility, the technology described herein is not limited to such facilities. For example, the robotic devices, systems, and methods described herein can be utilized to transport aircraft in other types of facilities such as, for example, service depots, storage depots, etc. The facility data described herein can include information associated with these and/or other types of facilities (e.g., current/planned aircraft locations within, designated areas, map data, etc.). This can allow aircraft to be transported among or between any of: landing pads, parking locations, maintenance locations, storage areas (e.g., hangers), and/or other types of areas within the facilities.

Figure 3:
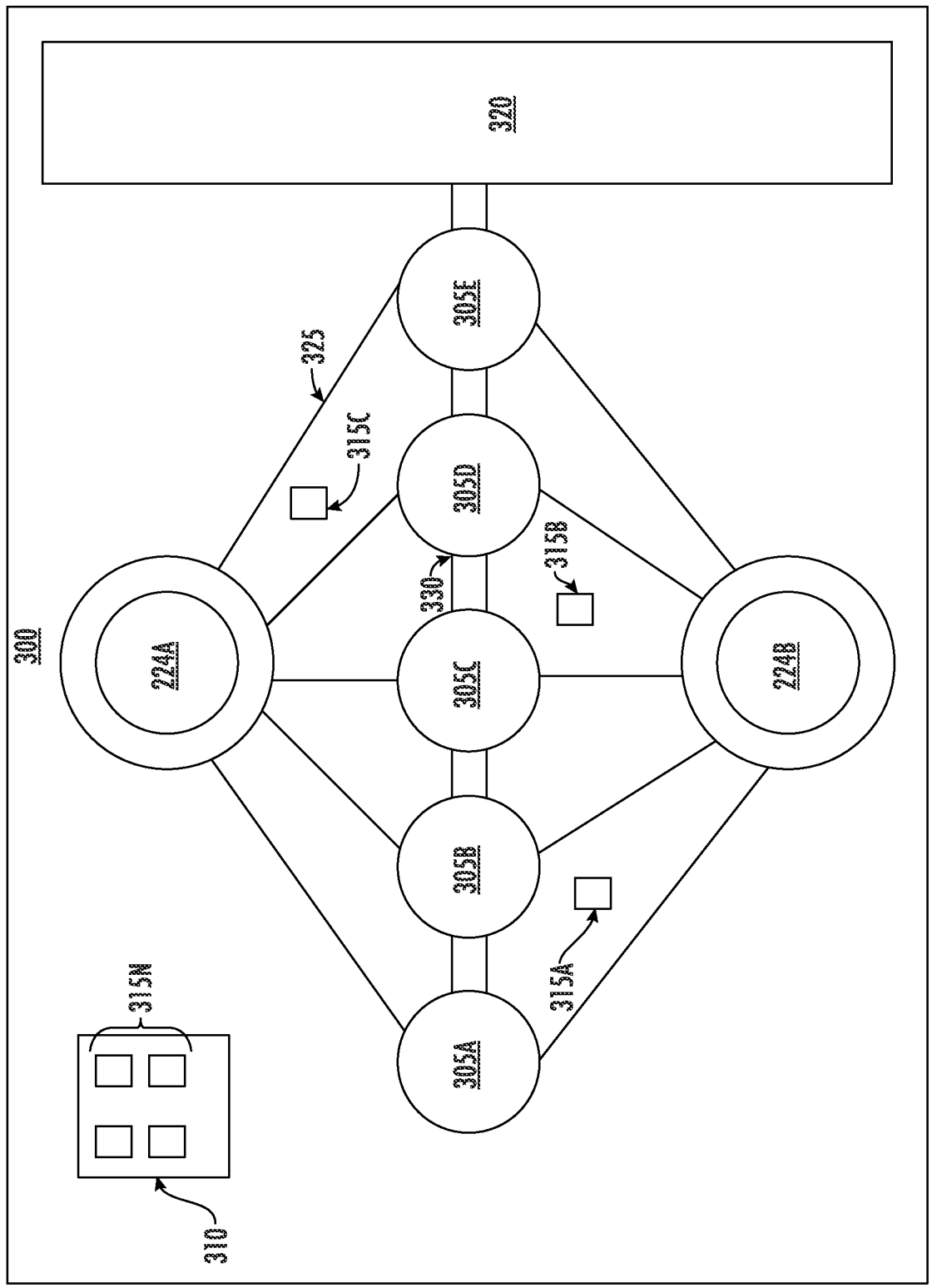
FIG. 3 depicts an example aerial transport facility landing area according to example implementations of the present disclosure.

FIG. 3 depicts an example aerial transport facility landing area 300 according to example implementations of the present disclosure. An aerial transport facility can include a landing area 300 defined by one or more edges (e.g., a boundary of a roof, parking garage, etc.). The landing area 300 can include a plurality of zones 224, 305, 310, 320, 325. Each zone can be configured to facilitate the transfer of a plurality of aircraft landing and/or taking-off from the aerial transport facility. For example, the plurality of zones 224, 305, 310, 320, 325 can include one or more landing pads 224A-B where aircraft can land and/or take-off, one or more parking locations 305A-E where passengers can board and/or depart from an aircraft, one or more maintenance locations 310 where aircraft can receive a charge, repairs, etc., one or more travel ways 325 where aircraft can transfer from one zone to another, one or more passenger walkways 330 where passengers can access an aircraft, one or more terminals 320 where passengers can assess the landing area 300, etc.

A computing system (e.g., a cloud services system, one or more facility computing devices, etc.) can be configured to control, route, monitor, and/or communicate with aircraft in the vicinity of the aerial transport facility. The computing system can be configured to determine or aid in determining respective routes for the aircraft for landing on the aerial transport facility and/or taking-off from the aircraft landing facility. In addition, or alternatively, the computing system can determine respective landing pad locations 224A-B on which the aircraft can land and/or depart from, respective parking locations 305A-E on which the aircraft can park between transport services, respective maintenance locations 310 on which the aircraft can receive maintenance, etc.

In some implementations, the computing system can be configured to detect the location of a plurality of aircraft at the aerial transport facility. For example, the aerial transport facility can utilize one or more sensors to detect a location of aircraft relative to a respective landing pad 224 (e.g., during approach, landing, etc.), a location of the aircraft relative to a respective parking location 305 and/or maintenance location 310, a location of the aircraft relative to a travel way 325 (e.g., en route to a respective landing pad 224, parking location 305, maintenance location 310, storage location), etc.

In addition, the computing system can be configured to help facilitate the transfer of the plurality of aircraft to one or more different zones 224, 305, 310, 320, 325, 330 of the landing area 300 of the aerial transport facility. For example, the aerial transport facility can include a plurality of robotic devices 315A-N. Each robotic device 315 can be configured to push, pull, drag, or otherwise move an aircraft within the landing area 300 of the aerial transport facility.

Figure 4:
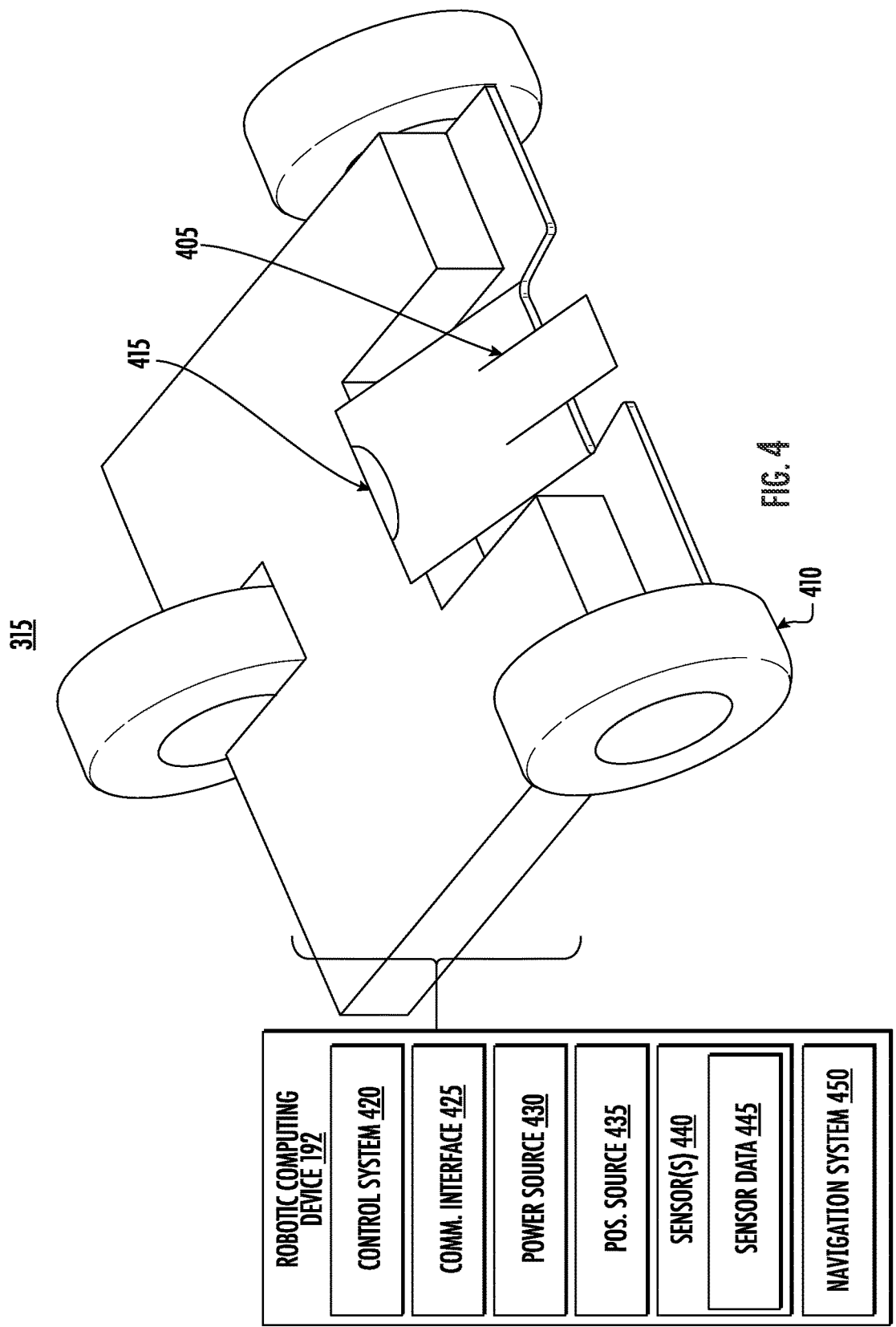
FIG. 4 depicts an example robotic device according to example implementations of the present disclosure.

By way of example, FIG. 4 depicts an example robotic device 315 according to example implementations of the present disclosure. Each device 315 can include: one or more transportation mechanisms 410 such as one or more wheels (e.g., three wheels, etc.) and/or tracks configured to move the device 315; one or more linear lifting mechanisms 405 such as, for example, one or more linear actuators, hydraulic or pneumatic cylinders, etc. configured to lift an aircraft and/or portion thereof; and/or one or more physical connection features 415 such as, for example, one or more locking mechanisms configured to attach to an attachment location (e.g., a landing gear) of an aircraft.

Returning to FIG. 3, the computing system can communicate with a robotic device 315 at the aerial transport facility to cause the robotic device 315 to transfer aircraft between one or more different zones of the aerial transport facility. For example, the robotic device 315 can include a respective robotic computing device 192 (e.g., as discussed herein with reference to FIG. 1).

With reference to FIG. 4, the respective robotic computing device can include an onboard robot control system that includes one or more processors and one or more memories storing computer-readable instructions that when executed by the one or more processors cause the robotic device 315 to perform one or more operations. For example, the control system 420 can be configured to process instructions for moving the robotic device 315 and send control signals to various motion control systems (e.g., acceleration throttle, steering, braking, etc.) to control the motion of the robotic device 315. In addition, each robotic device can include one or more communication interfaces 425. The one or more communication interfaces 425 can include any circuits, components, software, etc. for communicating via one or more networks (e.g., LAN, MAN, WAN, wireless, internet, etc.). In this manner, the robotic device 315 can receive and execute instructions from the computing system.

In addition, or alternatively, the robotic device 315 can include one or more power sources 430 such as, for example, one or more batteries, etc. to power the movement of the robotic device 315. In some implementations, the aerial transport facility can include a storage and/or charging facility (e.g., 310 of FIG. 3) to store, maintain, repair, charge, etc. the robotic device 315. For instance, the robotic device 315 can include rechargeable electric batteries, each of which can be charged throughout the day, during the night, etc. at a charging facility of the aerial transport facility. Moreover, the robotic device 315 can include one or more positioning systems 435 such as, for example, one or more GPS sensors, IMU sensors, RFID tags, etc. configured to determine a current location of the device 315 (e.g., a location relative to the landing area of the aerial transport facility).

The robotic device 315 can be configured to automatically connect to an aircraft. For instance, the robotic device 315 can include one or more sensors 440 (e.g., camera, LiDAR, etc.) configured to collect robotic sensor data 445 indicative of its surrounding environment. For instance, the sensors 440 can include one or more vision sensors (e.g., camera(s), LIDAR sensor(s), RADAR sensors, etc.) and/or one or more other types of sensors (e.g., ultrasonic, microphone, etc.).

The robotic computing system 192 can include a navigation system 450 configured to autonomously navigate the robotic device 315 from one location to another. For example, the control system 420 can receive motion control instructions, coordinates, motion parameters (e.g., heading, acceleration, braking, velocity, etc.) and/or other information from the navigation system 450. The control system 420 can implement this information to cause the robotic device 315 to travel in a certain direction, along a trajectory, path, etc.

In some implementations, the robotic computing system 192 (e.g., navigation system 450, etc.) can include model(s), algorithm(s), rule(s), etc. to perceive object(s) within the external environment of the robotic device 315 based at least in part on sensor data 445. By way of example, the robotic computing system 192 can process image data collected by the sensor(s) 440 to determine that an object (e.g., a suitcase, etc.) is blocking a path of the robotic device 315 and/or is within a threshold distance of the path (e.g., 1, 2, 3, feet, etc.). The robotic computing system 192 (e.g., navigation system 450, etc.) can adjust, change, update, etc. the motion of the robotic device 315 and send associated instructions to the control system 420. The control system 420 can implement the instructions to move the robotic device 315 around the detected object.

In some implementations, the sensor(s) 440 can gather sensor data 445 that can be used to determine and confirm real-time locations of object(s) at the aerial facility. For example, the sensor data 445 can be indicative of the surrounding environment of the robotic device 315. The sensor data 445 can include image data and/or other types of data depicting aircraft, other robotic devices, facility infrastructure, luggage, etc. The sensor data 445 can be tagged with location data associated with the time/position of the robotic device 315, when the sensor data 445 was acquired. The robotic computing device 192 and/or another system can determine the real-time location of the objects in the aerial facility based at least in part on the sensor data 445 and the tagged information. In some implementations, sensor data from more than one robotic device can be used to determine a location of an object (e.g., aggregating and cross-checking the sensor data/locations, etc.).

Figure 5:
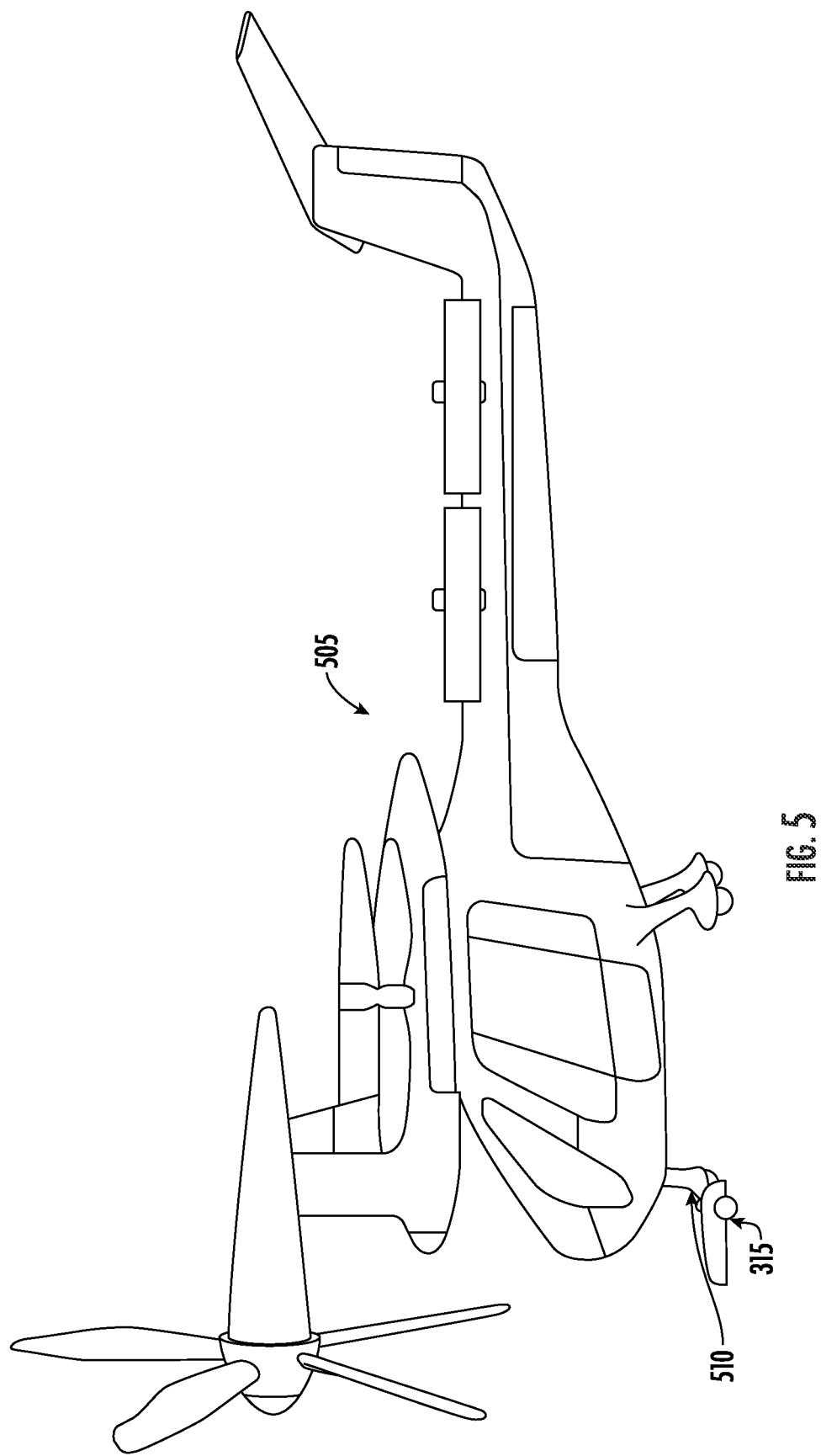
FIG. 5 depicts an aircraft being connected to a robotic device according to example implementations of the present disclosure.

FIG. 5 depicts an aircraft 505 being connected to a robotic device 315 according to example implementations of the present disclosure. The robotic device 315 can be configured to detect a connection point 510 (e.g., a front wheel, other structural point, etc.) of the aircraft 505 based on the robotic sensor data (e.g., sensor data 440) and automatically attach to the connection point 510. By way of example, the robotic device 315 can obtain sensor data indicative of a portion of the aircraft 505 that the robotic device 315 can physically or otherwise (e.g., magnetically) attach to. The robot control system can adjust an attachment mechanism (e.g., robotic arm, magnet, clamp, clasp, hook, etc.) to affix the attachment mechanism to the aircraft 505 (e.g., by closing a robotic gripper or similar such mechanism onto/around/underneath the identified portion of the aircraft 505).

Turning back to FIG. 3, the computing system can coordinate the movement of a plurality of robotic devices 315A-N at the aerial transport facility based on real time data. For example, the computing system can obtain facility data (e.g., facility data 155 of FIG. 1) associated with a flight itinerary of an aircraft. The flight itinerary can be indicative of one or more aspects of a current aerial transportation service being performed by the aircraft and/or one or more aspects of one or more subsequent aerial transportation services that the aircraft is scheduled to perform. For instance, the flight itinerary can be indicative of the aircraft's origination location (e.g., an aerial transport facility that the aircraft is approaching), a destination location (e.g., an aerial transport facility that the aircraft is approaching or one on which the aircraft is currently landed), a flight time (e.g., the time of travel between the origination location and the destination location), a distance travelled, an estimated arrival time (e.g., an estimated time that the aircraft will land at the destination location), an estimated arrival location (e.g., a landing location at the destination location), and/or any additional aspects descriptive of a current aerial transportation service. In addition, the flight itinerary can be indicative of one or more subsequent destinations of the aircraft, an estimated departure time, an estimated departure location (e.g., a take-off location of the destination location), an estimated boarding time for passengers of a subsequent aerial transportation service, and/or any other aspects descriptive of one or more subsequent aerial transportation services.

The facility data 155 can be indicative of at least an aerial transport facility at which the aircraft is to be located (e.g., a current destination location such as an aerial transportation facility that the aircraft is approaching for landing and/or at which the aircraft is scheduled to land). For example, the facility data 155 can be received at a cloud services system (e.g., cloud services system 102 of FIG. 1) from an aerial device (e.g., aerial computing device 142 of FIG. 1) of the aircraft (e.g., aircraft 505 of FIG. 5) and/or aerial facility computing system (e.g., aerial facility computing devices 152 of FIG. 1). As another example, the facility data 155 can be received at the aerial facility computing system from the cloud services system and/or one or more aerial computing devices (e.g., aerial computing device(s) 142 of FIG. 1) of a plurality of aircraft at (e.g., parked, landed on, etc.) the landing area 300 of the aerial transport facility. For instance, the computing system can directly and/or indirectly receive this data from the plurality of aircraft, the cloud services system, etc.

The facility data 155 can describe one or more aspects of the aerial transport facility that the aircraft is approaching, will be located, or on which the aircraft is currently located. For example, the facility data 155 can include data descriptive of a current aerial transport facility state. The current aerial transport facility state can include state information for one or more zones 224, 305, 310, 320, 325 of the landing area 300 of the aerial transport facility. For instance, the state information can be indicative of whether a zone of the aerial transportation facility is currently occupied, unoccupied, active (e.g., in use), inactive (e.g., not in use), etc.

Figure 6:
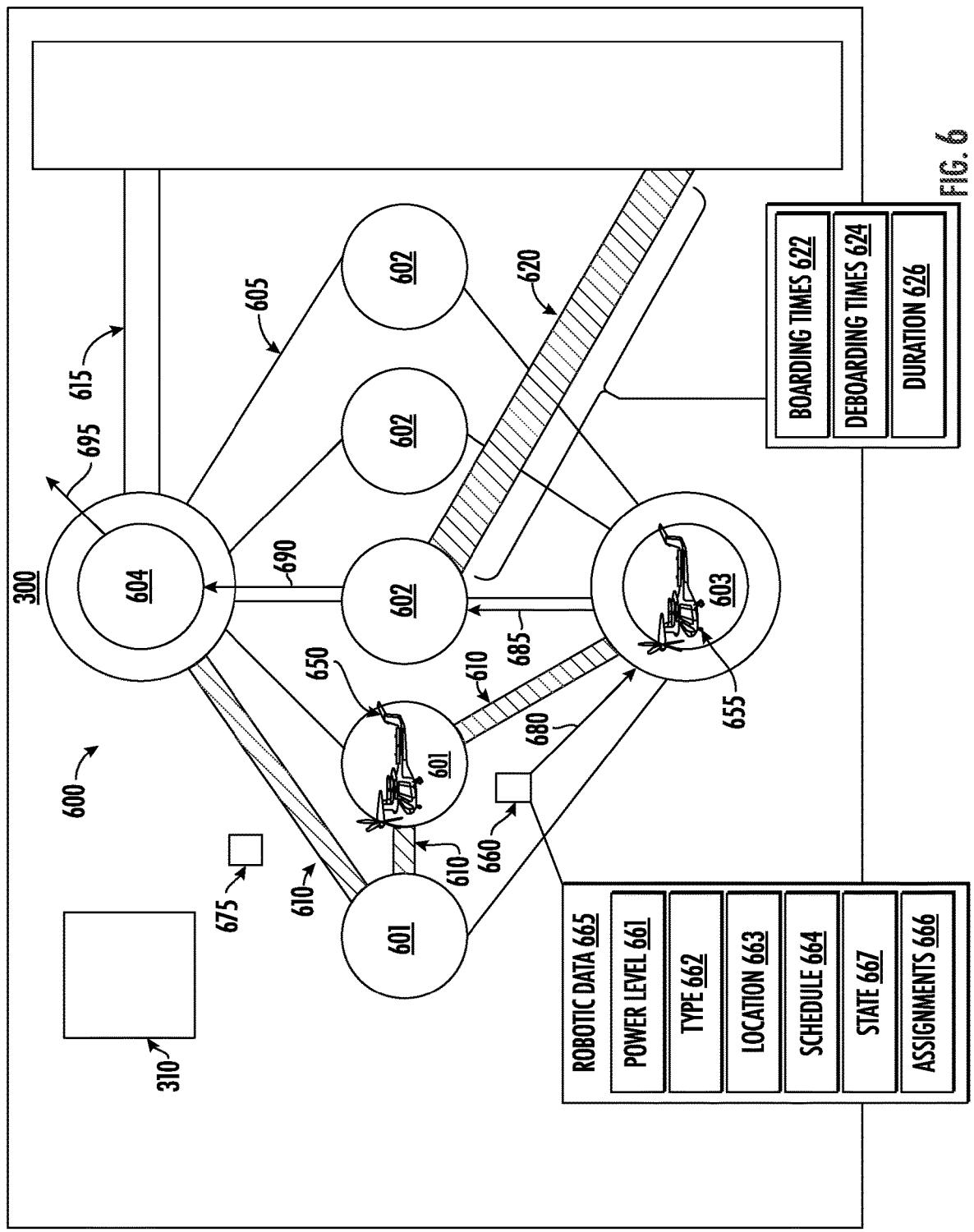
FIG. 6 depicts an example current aerial transport facility state according to example implementations of the present disclosure.

By way of example, FIG. 6 depicts an example current aerial transport facility state 600 according to example implementations of the present disclosure. The current aerial transport facility state 600 can indicate whether each parking location of the landing area 300 of the aerial transport facility is occupied and/or unoccupied. For example, parking locations 601 can be occupied while parking locations 602 can be unoccupied. The current aerial transport facility state 600 can indicate whether each landing pad of the aerial transport facility is active (e.g., receiving an incoming aircraft, facilitating the take-off of an out-going aircraft, etc.) or inactive. For example, landing pad 603 can be active while landing pad 604 can be inactive. The current aerial transport facility state 600 can indicate whether each travel way of the aerial transportation facility is active (e.g., allowing aircraft to cross the landing area of the aerial transportation facility) or inactive. For example, travel ways 610 can be active, while travel ways 605 can be inactive. The current aerial transport facility state 600 can indicate whether each passenger walkway of the aerial transportation facility is active (e.g., allowing passengers to cross the landing area of the aerial transportation facility) or inactive. For example, passenger walkways 620 can be active, while passenger walkways 615 can be inactive. In addition, or alternatively, the current aerial transport facility state 600 can indicate whether each maintenance facility 310 of the aerial transportation facility is active (e.g., servicing an aircraft) and/or inactive, etc. For example, maintenance facility 310 can be inactive (e.g., not servicing aircraft).

The current aerial transport facility state 600 can be determined based, at least in part, on facility sensors, communications between the plurality of aircraft 650, 655, and/or aerial transfer data. As an example, the aerial transport facility can include one or more sensors configured to detect a location associated with each of a plurality of aircraft landing, parked, and/or taking-off from the aerial transport facility. In addition, or alternatively, each of the plurality of aircraft 650, 655 can be configured to communicate a location (e.g., GPS coordinates, a location relative to the landing area of the aerial transport facility, etc.) associated with the respective aircraft to the computing system. The current aerial transport facility state 600 can be determined based on the location of the plurality of aircraft 650, 655. For example, a respective zone 601 of the landing area 300 can be set to occupied, in use, etc. in the event that an aircraft 650 is located within the respective zone 601.

As another example, the current aerial transport facility state 600 can be determined based on aerial transfer data. For example, the facility data 155 can include aerial transfer data indicative of one or more flight itineraries for a plurality of aircraft scheduled to land, park, or take-off from the aerial transport facility. Each respective flight itinerary of the one or more flight itineraries can indicate a landing time, boarding time, departure time, etc. for a respective aircraft at the aerial transport facility. In addition, or alternatively, the aerial transfer data can be indicative of one or more parking location, maintenance location, etc. assignments. For instance, each assignment can be indicative of a scheduled parking/maintenance duration during which a respective aircraft is located at a respective parking location. The current aerial transport facility state 600 can be determined based on the location (e.g., scheduled location, estimated location, etc.) of the plurality of aircraft at the landing area 300 as identified by the aerial transfer data.

As another example, the current aerial transport facility state 600 can be determined based on rider data. For example, the computing system can obtain rider data associated with a plurality of aircraft passengers. The plurality of aircraft passengers, for example, can include a plurality of users of an aerial service provider. The rider data can be indicative of the multi-modal transportation itineraries of passengers and/or include information on the progress of one or more passengers for each of the one or more flight itineraries. For example, the rider data can indicate an estimated time of arrival (e.g., at the aerial transport facility) for one or more passengers of an aircraft associated with the one or more flight itineraries. In some implementations, the rider data can indicate a check-in status of the one or more passengers (e.g., a ready to board the aircraft status), a boarded status (e.g., the passenger has boarded the aircraft), etc. The rider data can also indicate which passengers are assigned to which aircraft located (or to be located) at an aerial transport facility.

In some implementations, the computing system can dynamically determine one or more passenger walkways 620 of the landing area 300 based on the rider data. By way of example, the computing system can determine one or more boarding times 622 (e.g., a time period during which passengers are in the progress of boarding an aircraft) and/or deboarding times 624 (e.g., a time period during which passengers are in the progress of departing from an aircraft) for each of the one or more flight itineraries associated with the aerial transport facility (e.g., as indicated by the aerial transfer data). For instance, the computing system can determine the one or more boarding and/or deboarding times 622, 624 based on a progress of one or more passengers assigned to an aircraft located (or to be located) at an aerial transport facility (e.g., as indicated by the rider data). The computing system can dynamically determine the one or more passenger walkways 620 of the landing area 300 during the one or more boarding 622 and/or deboarding times 624. By way of example, each passenger walkway 620 can include a path to and/or from an aircraft located (or to be located) at the aerial transport facility during a boarding time 622 and/or deboarding time 624 (e.g., as indicated by the rider data) for the respective aircraft.

In some implementations, the computing system can determine a boarding duration 626 for an aircraft based, at least in part, on the rider data. For example, the boarding duration 626 can include a time duration from a first passenger boarding an aircraft to a last passenger to board the aircraft. The current aerial transport facility state 600 can be determined based on the boarding duration 626. For example, one or more passenger walkway 620, travel ways 610, etc. of the landing area 300 can be determined to be prohibited based on the boarding duration 626. As an example, a passenger walkway 620 leading to a respective aircraft 655 can be prohibited during a boarding duration 626 for the respective aircraft 655.

The computing system can determine a robotic device 660 of the plurality of robotic devices (e.g., 315A-N of FIG. 3) at the aerial transport facility to transport an aircraft 650, 655 within the landing area 300 of the aerial transport facility. For instance, the computing system can determine (e.g., select) the robotic device 660 based on the facility data 155 (e.g., the aerial transfer data, current aerial transport facility state 600, etc.). In addition, or alternatively, the computing system can determine the robotic device 660 based on robotic data 665. For example, the computing system can obtain robotic data 665 associated with each respective robotic device of the plurality of robotic devices. The robotic data 665 can be indicative of a power level 661, type 662 (e.g., a type of connection interface, weight limits, size limits, etc.), location 663 (e.g., GPS data, a location relative to the landing area of the landing facility, etc.), schedule 664 (e.g., a current state of the device 667 (e.g., in use, available, etc.), one or more future assignments for the device 666 (e.g., transportation assignment for the day), connection and/or other type of hardware of the robot, and/or any other characteristics associated with a respective robotic device 660. The computing system can determine the robotic device 660 to transport the aircraft 655 within the landing area 300 of the aerial transport facility based on a comparison of the facility data 155 (e.g., current aerial transport facility state 600) and the robotic data 665.

By way of example, the computing system can determine the robotic device 660 by filtering the plurality of robotic devices by power level 661, type 662, schedule 664, location 663, state 667, assignments 666, etc. For example, the computing system can filter the plurality of robotic devices to identify one or more of the plurality of robotic devices that are available and capable of transporting the aircraft 655 within the landing area 300. For example, the computing system can compare a respective location 663 of the robotic device 660 to the landing location 603 of the aircraft 655 (e.g., as identified by the flight itinerary) to determine that the landing location 603 is accessible to the robotic device 660 (e.g., not blocked by one or more occupied or active zones of the landing area 300). As another example, the computing system can compare a respective schedule 664 of the robotic device 660 to the estimated arrival time for the aircraft (e.g., as identified by the flight itinerary) to determine that the robotic device 660 is available to transport the aircraft 655 at the arrival time (e.g., not busy during or prior to the arrival of the aircraft).

Additionally, or alternatively, the computing system can determine which of the robotic devices has the hardware needed to transport the aircraft 655, which, in some implementations, can be one of many types of aircrafts online with the transportation network/platform. In some implementations, the computing system can compare a respective type 662 of the robotic device 660 to an aircraft type of the aircraft 655. For example, in some implementations, the aircraft 655 can include an aircraft type of a plurality of aircraft types. Each aircraft type can be indicative of a shape, size, weight, landing gear type, etc. of the aircraft. For instance, one or more aircraft types can include different landing gear types (e.g., skids, tracks, wheels, etc.). In such a case, the computing system can compare the robotic device 660 (and its hardware infrastructure, ability to conform to aircraft, etc.) to the aircraft type of the aircraft 655 to ensure that the robotic device 660 can attach to and move the aircraft 655.

In addition, or alternatively, the computing system can compare a power level 661 of each of the plurality of robotic devices to an estimated parking time associated with the aircraft 655. For example, the computing system can determine a parking time for the aircraft at a parking location based on the flight itinerary. For instance, the computing system can determine the parking time based on the estimated arrival time, estimated boarding time 622, estimated departure time, etc. By way of example, the parking time can include the time from the arrival time to the departure time. In addition, or alternatively, the parking time can be determined based on the rider data. For instance, the computing system can determine a boarding duration 626 for the aircraft 655 based on the rider data. In such a case, the computing system can determine the parking time for the aircraft at a parking location based on the boarding duration 626.

In some implementations, the robotic device 660 can remain physically connected to the aircraft during the parking time. In such a case, the computing system can determine whether the robotic device 660 is associated with a power level 661 that can power the device from pick-up time, through parking time, to the departure time. For example, the computing system can determine a power level threshold based on the parking time and/or one or more aspects of the flight itinerary, facility data 155, and/or rider data. The power level threshold can represent a minimum power level for transferring the aircraft 655. The computing system can determine the robotic device 660 to transfer the aircraft 655 such that the robotic device 660 is associated with a power level 661 higher than the minimum power level. Additionally, or alternatively, the computing system can determine which robotic device 660 to assign to transfer the aircraft 655 based at least in part on the power level 661 of the robotic device 660. By way of example, the computing system can determine whether the robotic device 660 has a sufficient charge level to be able to tow an aircraft from a landing pad to a parking area, charging areas, storage areas, etc.

The computing system can access map data indicative of the landing area 300 of the aerial transport facility. The map data can identify one or more accessible areas 602, 604, 605, 615, etc. of the landing area 300 and/or one or more prohibited areas 601, 603, 610, 620, etc. of the landing area 300. For example, the map data can include a representation of the landing area 300 defined by one or more edges. By way of example, the map data can include a representation of the edges of the landing area 300, the location of one or more parking locations 601, 602, landing pads 603, 604, travel ways 605, 610, passenger walkways 615, 620, etc. and/or the area therebetween. The map data can be predetermined (e.g., preloaded by an engineer, etc.) based on the aerial transport facility. For example, the map data can be different for each aerial transport facility based on the layout of the landing area 300 of the aerial transport facility. The one or more prohibited areas 601, 603, 610, 620, etc. and/or accessible areas 602, 604, 605, 615, etc. of the map data can be predetermined and/or dynamically determined.

For example, the one or more prohibited areas 601, 603, 610, 620, etc. can include one or more edges of the landing area 300, one or more parking locations 601, landing pads 603, travel ways 610, passenger walkways 620, etc. Each of the one or more prohibited areas 601, 603, 610, 620, etc. can be determined based on the facility data 155. For example, the prohibited areas 601, 603, 610, 620, etc. can be determined based on the current state 600 of the aircraft landing area 300. By way of example, each of the one or more parking locations 610, 602, landing pads 603, 604, travel ways 605, 610, passenger walkways 615, 620, etc. of the landing area 300 can be determined to be accessible and/or prohibited based on the current state 600 of the aircraft landing area 300. For instance, a parking location 601 can be prohibited in the event that the parking location 601 is currently occupied (e.g., as identified by the current state 600 of the aircraft landing area 300), etc. In this manner, the computing system can dynamically determine the one or more prohibited areas 601, 603, 610, 620, etc. of the landing area 300 based on the current information as indicated by the facility data 155, the rider data, etc. For instance, the prohibited areas 601, 603, 610, 620, etc. can change over time based on the rider data and the aerial transfer data. For example, the one or more passenger walkways 615, 620, the occupancy of one or more landing pads 603, 604, parking areas 601, 602, etc. can change throughout the day based on the rider data (e.g., boarding times, deboarding time determined from the rider data), facility data 155 (e.g., currently occupied areas determined from the facility data), aerial transfer data (e.g., soon to be occupied areas determined from the aerial transfer data), etc.

In some implementations, the map data can include a representation of the landing area 300 with one or more geofences indicative of the one or more prohibited areas 601, 603, 610, 620, etc. For example, each prohibited area of the landing area 300 can be outlined by a geofence. Each geofence, for example, can be dynamically assigned to a prohibited area of the landing area 300 as one or more prohibited areas 601, 603, 610, 620, etc. are determined for the landing area 300. The computing system can monitor the movement of each of the plurality of robotic devices and trigger a respective robotic device 660 avoid the one or more dynamically assigned geofences. In addition, or alternatively, the robotic device 660 can have access to the map data and can be configured to automatically stop, turn around, and/or otherwise avoid the one or more geofenced areas. In this manner, the landing location 603 of the aircraft 655 can be accessible to the robotic device 660 in the event that the robotic device 660 is not blocked by one or more prohibited areas 601, 603, 610, 620 (e.g., as identified by the one or geofences) of the landing area 300 (e.g., as represented by the map data). In addition, the landing location 603 of the aircraft 655 can be inaccessible to a robotic device 670 in the event that the robotic device 670 is blocked by one or more prohibited areas 610 (e.g., as identified by the one or geofences) of the landing area 300 (e.g., as represented by the map data).

The computing system can determine a plurality of routes for each of the plurality of robotic devices based on the facility data 155, map data, robotic data, etc. Each route can include a travel path within the landing area 300 of the aerial transport facility. For instance, the routes can include a dead-head route to position a respective robotic device at one or more locations of the landing area, a pick-up route for the robotic device to pick-up an aircraft, a parking route for the robotic device to transfer the aircraft to a parking location, a drop-off route for the robotic device to drop-off an aircraft, a departure route for the robotic device to leave an aircraft, etc. The plurality of routes can be determined such that the robotic devices avoid one or more prohibited areas 601, 603, 610, 620, etc. of the landing area 300 of the aerial transport facility.

For instance, the computing system can determine a first route 680 (e.g., a pick-up route) for the robotic device 660 to travel within the landing area 300 to the aircraft 655 based, at least in part, on the facility data 155, map data, aerial transfer data, rider data, etc. For example, the computing system can determine the pick-up route 680 for the robotic device 660 to travel within the landing area 300 of the aerial transport facility based, at least in part, on the map data (e.g., as updated based on the current state 600 of the aircraft landing area 300 as determined based on the aerial transfer data, rider data, etc.) and the landing location (e.g., landing pad 603) for the aircraft 655. For instance, the pick-up route 680 can include a route within the landing area 300 of the aircraft transport facility that avoids the one or more prohibited areas 601, 603, 610, 620, etc. of the landing area 300 as represented by the map data.

The computing system can generate one or more command instructions based on the pick-up route 680 and communicate the one or more command instructions to the robotic device 660. The robotic device 660 can receive the one or more command instructions and travel in accordance with the pick-up route 680 to the arrival location (e.g., a landing pad 603 of the landing area 300) of the aircraft 655. The robotic device 660 can be configured to physically connect to the aircraft 655 (e.g., a landing gear of the aircraft 655) after reaching the arrival location 603. For example, the computing system can instruct (e.g., via one or more command instructions) the robotic device 660 to connect to the aircraft after the robotic device 660 reaches the arrival location 603.

In addition, or alternatively, the robotic device 660 can automatically connect to a landing gear of the aircraft 655 for transporting aircraft 655 within the landing area 300 after reaching the arrival location 603. By way of example, the arrival location 603 can include a landing pad 603 of the landing area 300. The landing pad 603 can include an outside perimeter (e.g., a safe distance from a landing aircraft) and an interior perimeter (e.g., an area within the landing pad that the aircraft lands). In some implementations, the pick-up route 680 can direct the robotic device 660 to the outside perimeter. The robotic device 660 can automatically connect to the aircraft 655 by obtaining robotic sensor data from the one or more robotic sensors of the robotic device 660 (e.g., as discussed herein with references to FIGS. 4-5). The robotic device 660 can identify a landing gear location corresponding to the landing gear of the aircraft 655 within the interior perimeter of the landing pad 603 based on the robotic sensor data. The robotic device 660 can connect to the landing gear of the aircraft 655 based on the landing gear location.

In some implementations, the computing system and/or the robotic device 660 can obtain a landing notification indicating that the aircraft 655 has landed at the landing area (e.g., within the interior perimeter) of the landing pad 603. The computing system and/or the robotic device 660 can receive the landing notification from one or more sensors of the aerial transport facility (e.g., sensing that an object has touched down on the landing pad 603). In some implementations, the computing system can receive sensor data indicating that the aircraft 655 has landed at the aerial transport facility, and in response generate and provide the landing notification to the robotic device 660.

In addition, or alternatively, the computing system and/or the robotic device 660 can receive the landing notification from the aircraft 655. By way of example, the aircraft 655 can include one or more aerial devices (e.g., a pilot device, a vehicle computing system, etc.) such as, for example, the one or more aerial computing devices 142 discussed herein with reference to FIG. 1. In some implementations, the aerial devices can detect that the aircraft 655 has landed (e.g., via pilot input, sensor data indicative of touching down, etc.) and generate and provide the landing notification to the computing system and/or the robotic device 660.

In some implementations, the robotic device 660 can connect to the landing gear of the aircraft 655 based on the landing notification. For instance, the robotic device 660 can park at the exterior perimeter of the landing pad 603 (e.g., FATO) until a landing notification is received. In response to receiving the landing notification, the robotic device 660 can enter the interior perimeter of the landing pad 603 and automatically connect (e.g., using robotic sensor data) to the landing gear of the aircraft 655. In addition, or alternatively, the computing system can, in response to receiving the landing notification, communicate one or more command instructions to the robotic device 660 to connect to the landing gear of the aircraft 655.

The computing system can determine a parking location 602 (e.g., one or more available parking locations of the aerial transport facility) for the aircraft 655. In some implementations, the parking location 602 can be predetermined. For example, the flight itinerary can include an assigned parking location for the aircraft 655 at the aerial transport facility. In addition, or alternatively, the computing system can determine the parking location 602 based, at least in part, on the facility data 155 (e.g., the aerial transfer, rider data, etc.). For example, the parking location 602 can be determined in real time based on the current aerial transport facility state 600 (e.g., at one or more available parking locations 602 of the landing area 300 of the aerial transport facility).

The computing system can determine a second route 685 (e.g., a parking route) for the robotic device 660 (e.g., now physically connected to the aircraft 655) to travel within a landing area 300 of the aerial transport facility to the parking location 602. For example, the computing system can determine the parking route 685 based, at least in part, on the facility data 155 and/or the map data. For example, the computing system can determine the parking route 685 for the robotic device 660 to travel within the landing area 300 of the aerial transport facility based, at least in part, on the map data (e.g., as updated based on the current state of the aircraft landing area 600), the landing location 603 for the aircraft 655, and the parking location 602 for the aircraft 655. For instance, the parking route 685 can include a route within the landing area 300 of the aerial transport facility that avoids the one or more prohibited areas 601, 603, 610, 620, etc. of the landing area 300 as represented by the map data and/or determined based on the aerial transfer data (e.g., to avoid one or more prohibited areas), rider data (e.g., to avoid one or more walkways during boarding or deboarding), etc.

In some implementations, the computing system can obtain an attached notification indicating that the robotic device 660 has attached to the landing gear of the aircraft 655. For example, robotic device 660 can be configured to detect an attachment to the aircraft 655 (e.g., via robotic sensor data) and, in response, transmit the attached notification to the computing system. In addition, or alternatively, one or more aerial devices (e.g., aerial computing device 142 of FIG. 1) can detect the attachment and, in response, transmit the attached notification to the computing system and/or the robotic device 660. In some implementations, the parking location 602 and/or the parking route 685 can be determined in response to the attached notification.

The computing system can generate one or more command instructions based on the parking route 685 and communicate the one or more command instructions to the robotic device 660. The robotic device 660 can receive the one or more command instructions and travel in accordance with the parking route 685 to the parking location 602 (e.g., a parking location of the landing area 300). The robotic device 660 can be configured to physically drag, pull, and/or push the aircraft 655 (e.g., a landing gear of the aircraft 655) to the parking location 602. In this manner, the aircraft 655 can be transferred from the landing pad 603 to a parking location 602 by the robotic device 660. The aircraft 655 can remain parked at the parking location 602 for one or more aerial service provider actions such as, for example, allowing one or more passengers to exit/board the aircraft 655 (e.g., during a boarding duration 626, etc.), charging the aircraft 655 for another service, and/or performing maintenance on the aircraft 655. In some implementations, the robotic device 660 can transport the aircraft from a landing pad 603 to a maintenance location and/or a storage location.

In some implementations, the robotic device 660 can disconnect from the aircraft 655 (e.g., to service one or more other aircraft 650 of the aerial transport facility). For instance, the computing system can determine that the robotic device 660 can disconnect based on the flight itinerary (e.g., a long parking time, a need for maintenance, etc.) of the aircraft 655, rider data (e.g., a long boarding time, etc.), aerial transfer data, facility data 155, etc. The computing system can communicate one or more command instructions for the robotic device 660 physically connected to the aircraft 655 to disconnect from the aircraft 655 based, at least in part, on the determination. For example, the computing system can communicate one or more command instructions to the robotic device 660 to trigger the robotic device 660 to disconnect from the aircraft 655.

In some implementations, the computing system and/or robotic device 660 can obtain a disconnect notification (e.g., from the pilot device, facility device, etc.) indicating that the aircraft 655 requires an additional parking time (e.g., overnight parking, maintenance parking, etc.). In response to the disconnect notification, the computing system can communicate the one or more command instructions for the robotic device 660 physically connected to the aircraft 655 to disconnect from the aircraft 655. In addition, or alternatively, the robotic device 660 can receive the disconnect notification and, in response, automatically disconnect from the aircraft 655.

The computing system can determine a third route 690 (e.g., a drop-off route) for the robotic device 660 to travel within the landing area 300 to another landing pad 604 of the aerial transport facility to allow the aircraft 655 to take-off. In some implementations, the drop-off route 690 can be determined based on an estimated departure time of the aircraft 655 (e.g., as identified by the flight itinerary). For example, the computing system can determine the drop-off route 690 based, at least in part, on the facility data 155 and/or the map data. By way of example, the computing system can determine the drop-off route 690 for the robotic device 660 to travel within the landing area 300 of the aerial transport facility based on the map data as updated based on a future state of the aircraft landing area 300 at the estimated departure time, the parking location 602 for the aircraft 655, and the other landing pad 604. For instance, the drop-off route 690 can include a route within the landing area 300 of the aerial transport facility that avoids the one or more prohibited areas 601, 603, 610, 620, etc. of the landing area 300 at or before the departure time.

In some implementations, the computing system can obtain a boarded notification indicating that the aircraft 655 is ready to leave the parking location 602. For example, the one or more aerial devices can detect that a boarding process of the aircraft 655 has been completed. In response, the one or more aerial devices can transmit the boarded notification to the computing system and/or the robotic device 660. In some implementations, the drop-off route 690 can be determined in response to the boarded notification. For example, the computing system can determine the drop-off route 690 for the robotic device 660 to travel within the landing area 300 to a landing pad 604 of the aerial transport facility based on the boarded notification. For example, the drop-off route 690 can be determined in response to the boarded notification.

The computing system can generate one or more command instructions based on the drop-off route 690 and communicate the one or more command instructions to the robotic device 660. The robotic device 660 can receive the one or more command instructions and travel in accordance with the drop-off route 690 to the other landing pad 604 (e.g., a landing pad of the landing area). The robotic device 660 can be configured to physically drag, pull, and/or push the aircraft 655 (e.g., a landing gear of the aircraft 655) to the other landing pad 604. The aircraft 655 can prepare for take-off at the other landing pad 604.

The computing system can determine a fourth route 695 (e.g., a departure route) for the robotic device 660 to travel within the landing area 300 based on the facility data 155, map data, etc. The departure route 695, for example, can include a dead-head route, for example, to another location of the landing area 300. The departure route 695 can include a route to another aircraft (e.g., to service the other aircraft) landing at one or more landing pads of the landing area 300 and/or parked at one or more parking locations of the landing area 300. In addition, or alternatively, the departure route 695 can be determined based on robotic data 665. For instance, the departure route 695 can include a route to a storage and/or charging facility of the aerial transport facility, for example, in the event that the power level 661 of the robotic device 660 is below a servicing threshold (e.g., an average power level for servicing an aircraft). Moreover, in some implementations, the computing system can determine the departure route 695 for the robotic device 660 to travel within the landing area 300 based on the second landing pad 604. By way of example, the departure route 695 can include a route from the interior perimeter of the landing pad 604 to the exterior perimeter of the landing pad 604. In this manner, the robotic device 660 can be configured to move a safe distance away from the aircraft 655 before take-off.

The robotic device 660 can disconnect from the aircraft 655 and begin the departure route 695. In some implementations, the robotic device 660 can automatically disconnect from the aircraft 655 upon the completion of the drop-off route 690. In addition, or alternatively, the computing system can communicate one or more command instructions for the robotic device 660 physically connected to the aircraft 655 to disconnect from the aircraft 655 after the completion of the drop-off route 690. For example, the computing system can communicate one or more command instructions to the robotic device 660 to trigger the robotic device 660 to disconnect from the aircraft 655.

In some implementations, the computing system and/or robotic device 660 can obtain a departure notification indicating that the aircraft 655 is ready to take-off from the landing pad 604 (e.g., from pilot/aircraft device). In response to the departure notification, the computing system can communicate the one or more command instructions for the robotic device 660 physically connected to the aircraft 655 to disconnect from the aircraft 655. In addition, or alternatively, the robotic device 660 can receive the departure notification and, in response, automatically disconnect from the aircraft 655.

In some implementations, the computing system and/or robotic device 660 can provide a take-off notification to the aircraft device indicative of the progress of the robotic device 660 along the route (e.g., departure route 695). For example, the take-off notification can indicate that the robotic device 660 is a safe distance (e.g., the exterior perimeter of the landing pad 604) away from the aircraft 655. By way of example, the computing system and/or the robotic device 660 can obtain a location corresponding to the robotic device 660. The computing system and/or the robotic device 660 can compare the location to a take-off safety threshold (e.g., as indicated by an exterior perimeter). The computing system and/or the robotic device 660 can provide the take-off notification to the aircraft device in response to determining that the location is past the take-off safety threshold.

Figure 7:
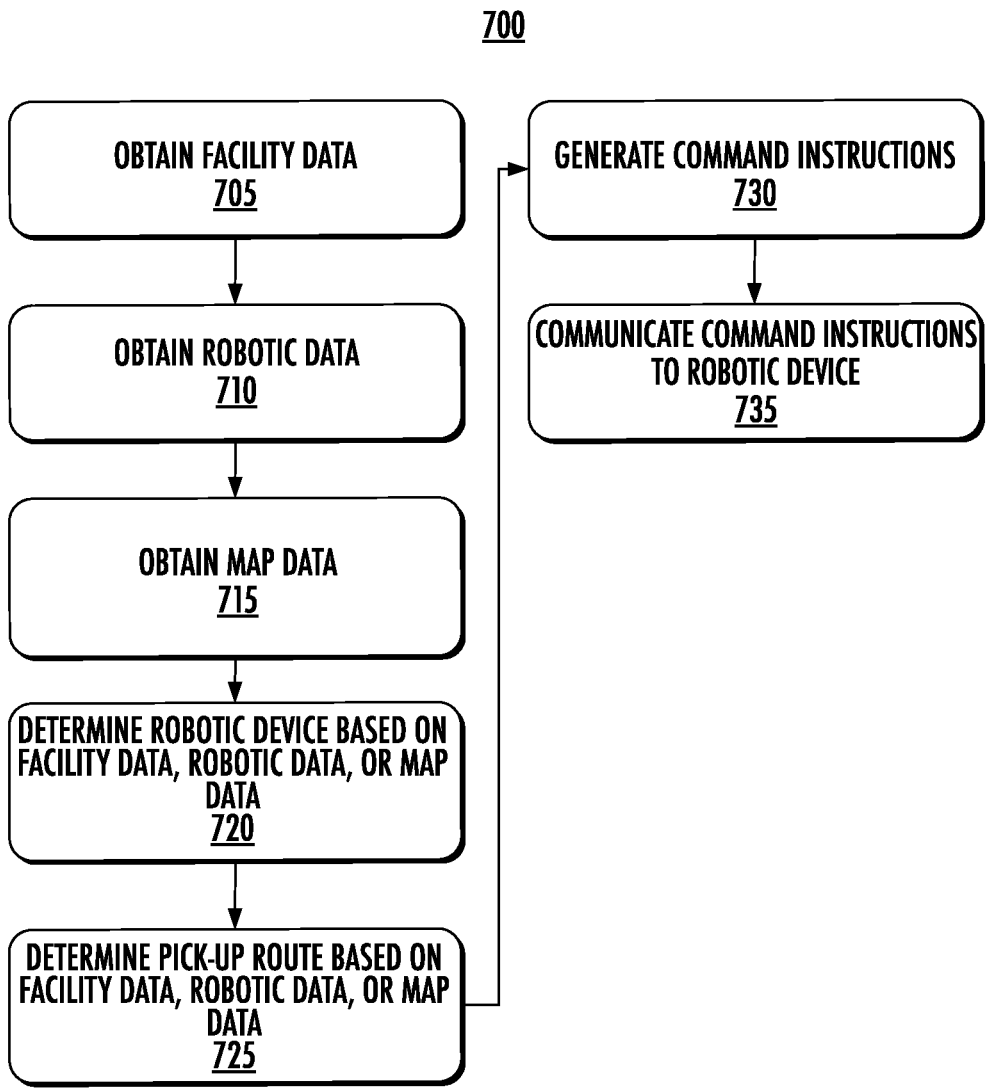
FIG. 7 depicts a flowchart of a method for transferring an aircraft according to aspects of the present disclosure.

Turning to FIG. 7, FIG. 7 depicts a flowchart of a method for transferring an aircraft according to aspects of the present disclosure. One or more portion(s) of the method 700 can be implemented by a computing system that includes one or more computing devices such as, for example, the computing systems described with reference to the other figures (e.g., the cloud services system 102, facility computing device 152, aerial computing device 142, etc.). Each respective portion of the method 700 can be performed by any (or any combination) of one or more computing devices. Moreover, one or more portion(s) of the method 700 can be implemented as an algorithm on the hardware components of the device(s) described herein (e.g., as in FIGS. 1, 2, 4, 10, etc.), for example, to transfer an aircraft within a landing area of an aerial transport facility. FIG. 7 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure. FIG. 7 is described with reference to elements/terms described with respect to other systems and figures for exemplary illustrated purposes and is not meant to be limiting. One or more portions of method 700 can be performed additionally, or alternatively, by other systems.

At 705, the method 700 can include obtaining facility data. For example, a computing system (e.g., computing system 100, cloud services system 102, aerial computing devices 142, facility computing devices 152, robotic computing devices 192, etc.) can obtain facility data associated with a flight itinerary of an aircraft. For instance, the flight itinerary can be indicative of an arrival time and a landing location for the aircraft. The facility data can be indicative of at least an aerial transport facility at which the aircraft is located or to be located. The facility data can include aerial transfer data indicative of one or more flight itineraries for a plurality of other aircraft scheduled to park at or take-off from the aerial transport facility.

At 710, the method 700 can include obtaining robotic data. For example, a computing system (e.g., computing system 100, cloud services system 102, aerial computing devices 142, facility computing devices 152, robotic computing devices 192, etc.) can obtain robotic data indicative of at least one of a power level, type, location, hardware components/infrastructure, and/or schedule of one or more of the plurality of robotic devices.

At 715, the method 700 can include obtaining map data. For example, a computing system (e.g., computing system 100, cloud services system 102, aerial computing devices 142, facility computing devices 152, robotic computing devices 192, etc.) can access map data indicative of the landing area of the aerial transport facility. The map data can identify one or more accessible areas of the landing area and/or one or more prohibited areas of the landing area. For example, the one or more prohibited areas can include at least one of one or more walking areas, aircraft parking areas, and/or aircraft landing pads. The map data can be predetermined based, at least in part, on the landing area of the aerial transport facility. In addition, or alternatively, the one or more accessible areas and/or the one or more prohibited areas of the map data are determined based, at least in part, on the facility data.

At 720, the method 700 can include determining a robotic device based on facility data, robotic data, and/or map data. For example, a computing system (e.g., computing system 100, cloud services system 102, aerial computing devices 142, facility computing devices 152, robotic computing devices 192, etc.) can determine a robotic device of a plurality of robotic devices to transport the aircraft within a landing area of the aerial transport facility based, at least in part, on the facility data. For instance, the computing system can select, from among the plurality of robotic devices, the robotic device to transport the aircraft within the landing area of the aerial transport facility based, at least in part, on the robotic data.

In some implementations, the computing system can determine the robotic device to transport the aircraft within the landing area of the aerial transport facility based, at least in part, on the aerial transfer data. For example, the computing system can determine that the landing location of the flight itinerary is accessible to the robotic device based at least in part on a comparison of a respective location of the robotic device to the landing location for the aircraft. In addition, in some implementations, the computing system can determine that the robotic device is available to transport the aircraft at the arrival time of the flight itinerary based, at least in part, on a comparison of a respective schedule of the robotic device to the arrival time for the aircraft.

At 725, the method 700 can include determining a pick-up route based on facility data, robotic data, or map data. For example, a computing system (e.g., computing system 100, cloud services system 102, aerial computing devices 142, facility computing devices 152, robotic computing devices 192, etc.) can determine a pick-up route for the robotic device to travel within the landing area to the aircraft based, at least in part, on the facility data. In addition, or alternatively, the computing system can determine the pick-up route for the robotic device to travel within the landing area of the aerial transport facility based, at least in part, on the map data and/or the landing location for the aircraft. In some implementations, the computing system can determine the pick-up route for the robotic device to travel within the landing area to the aircraft based, at least in part, on rider data associated with a plurality of aircraft passengers.

At 730, the method 700 can include generating command instructions. For example, a computing system (e.g., computing system 100, cloud services system 102, aerial computing devices 142, facility computing devices 152, robotic computing devices 192, etc.) can generate command instructions for the robotic device to travel in accordance with the pick-up route.

At 735, the method 700 can include communicating command instructions to the robotic device. For example, a computing system (e.g., computing system 100, cloud services system 102, aerial computing devices 142, facility computing devices 152, robotic computing devices 192, etc.) can communicate one or more command instructions for the robotic device to travel in accordance with the pick-up route. The robotic device can travel in accordance with the route and, in some implementations, utilize its onboard sensor(s) to determine if any objects are within its path. The robotic device can autonomously navigate around any such objects (e.g., using its onboard sensor data to identify a clear path, etc.) to reach its desired destination.

In some implementations, the computing system can obtain a landing notification indicating that the aircraft has landed at the landing area of the landing facility. In response to the landing notification, the computing system can communicate one or more command instructions to the robotic device to connect to the landing gear of the aircraft. In some implementations, the robotic device can include one or more sensors. The robotic device can obtain sensor data from the one or more sensors, identify a landing gear location corresponding to the landing gear of the aircraft, and/or automatically connect to the landing gear of the aircraft based, at least in part, on the landing gear location.

Figure 8:
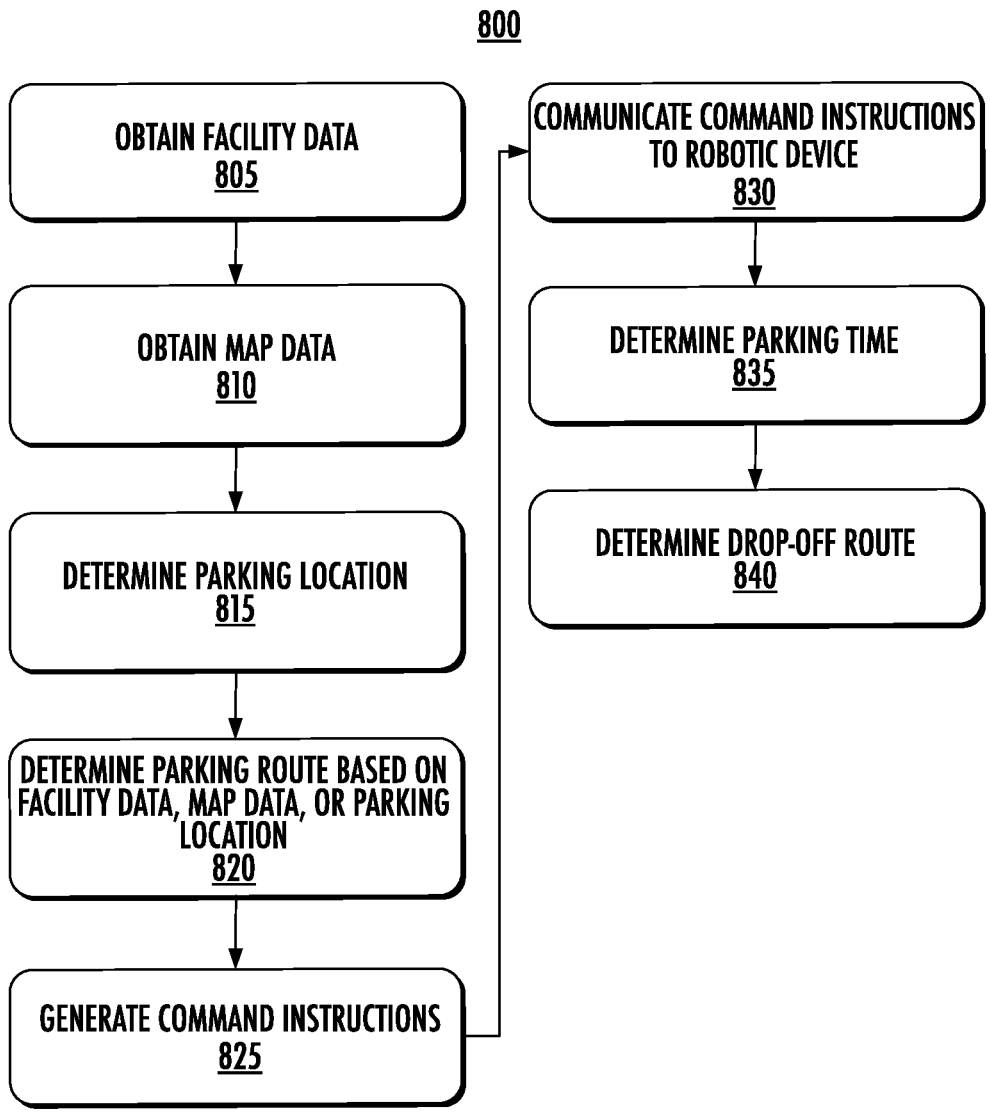
FIG. 8 depicts another flowchart of a method for transferring an aircraft according to aspects of the present disclosure.

Turning to FIG. 8, FIG. 8 depicts another flowchart of a method for transferring an aircraft according to aspects of the present disclosure. One or more portion(s) of the method 800 can be implemented by a computing system that includes one or more computing devices such as, for example, the computing systems described with reference to the other figures (e.g., the cloud services system 102, facility computing device(s) 152, aerial computing device(s) 142, robotic computing device(s) 192, etc.). Each respective portion of the method 800 can be performed by any (or any combination) of one or more computing devices. Moreover, one or more portion(s) of the method 800 can be implemented as an algorithm on the hardware components of the device(s) described herein (e.g., as in FIGS. 1, 2, 4, 10, etc.), for example, to transfer an aircraft within a landing area of an aerial transport facility. FIG. 8 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure. FIG. 8 is described with reference to elements/terms described with respect to other systems and figures for exemplary illustrated purposes and is not meant to be limiting. One or more portions of method 800 can be performed additionally, or alternatively, by other systems.

At 805, the method 800 can include obtaining facility data. For example, a computing system (e.g., computing system 100, cloud services system 102, aerial computing devices 142, facility computing devices 152, robotic computing devices 192, etc.) can obtain facility data associated with a flight itinerary of an aircraft. The facility data can be indicative of at least an aerial transport facility. In addition, or alternatively, the facility data can include aerial transfer data indicative of one or more flight itineraries for a plurality of other aircraft scheduled to park at or take-off from the aerial transport facility. In some implementations, the facility data can include rider data associated with a plurality of aircraft passengers.

At 810, the method 800 can include obtaining map data. For example, a computing system (e.g., computing system 100, cloud services system 102, aerial computing devices 142, facility computing devices 152, robotic computing devices 192, etc.) can access map data indicative of the landing area of the aerial transport facility. The map data can identify one or more accessible areas of the landing area and/or one or more prohibited areas of the landing area.

At 815, the method 800 can include determining a parking location. For example, a computing system (e.g., computing system 100, cloud services system 102, aerial computing devices 142, facility computing devices 152, robotic computing devices 192, etc.) can determine a parking location for the aircraft based, at least in part, on the facility data. In some implementations, the parking location for the aircraft can be determined based, at least in part, on the aerial transfer data.

At 820, the method 800 can include determining a parking route based on facility data, map data, and/or a parking location. For example, a computing system (e.g., computing system 100, cloud services system 102, aerial computing devices 142, facility computing devices 152, robotic computing devices 192, etc.) can determine a parking route for a robotic device physically connected to the aircraft to travel within a landing area of the aerial transport facility to the parking location based, at least in part, on the facility data.

At 825, the method 800 can include generating command instructions. For example, a computing system (e.g., computing system 100, cloud services system 102, aerial computing devices 142, facility computing devices 152, robotic computing devices 192, etc.) can generate one or more command instructions for the robotic device to travel in accordance with the parking route.

At 830, the method 800 can include communicating command instructions to the robotic device. For example, a computing system (e.g., computing system 100, cloud services system 102, aerial computing devices 142, facility computing devices 152, robotic computing devices 192, etc.) can communicate one or more command instructions for the robotic device to travel in accordance with the parking route.

At 835, the method 800 can include determining a drop-off route. For example, a computing system (e.g., computing system 100, cloud services system 102, aerial computing devices 142, facility computing devices 152, robotic computing devices 192, etc.) can determine a drop-off route for the robotic device to travel within the landing area to a landing pad of the aerial transport facility based, at least in part, on an estimated departure time. For example, the computing system can determine a parking time for the aircraft at the parking location based, at least in part, on the flight itinerary. The robotic device can remain physically connected to the aircraft during the parking time.

The parking time can be determined, for instance, by determining a boarding duration for the aircraft based, at least in part, on the rider data and/or determining the parking time for the aircraft at the parking location based, at least in part, on the boarding duration. For example, the flight itinerary for the aircraft can include a boarding time and an estimated departure time. The boarding duration can be determined based on the boarding time and/or the estimated departure time.

Figure 9:
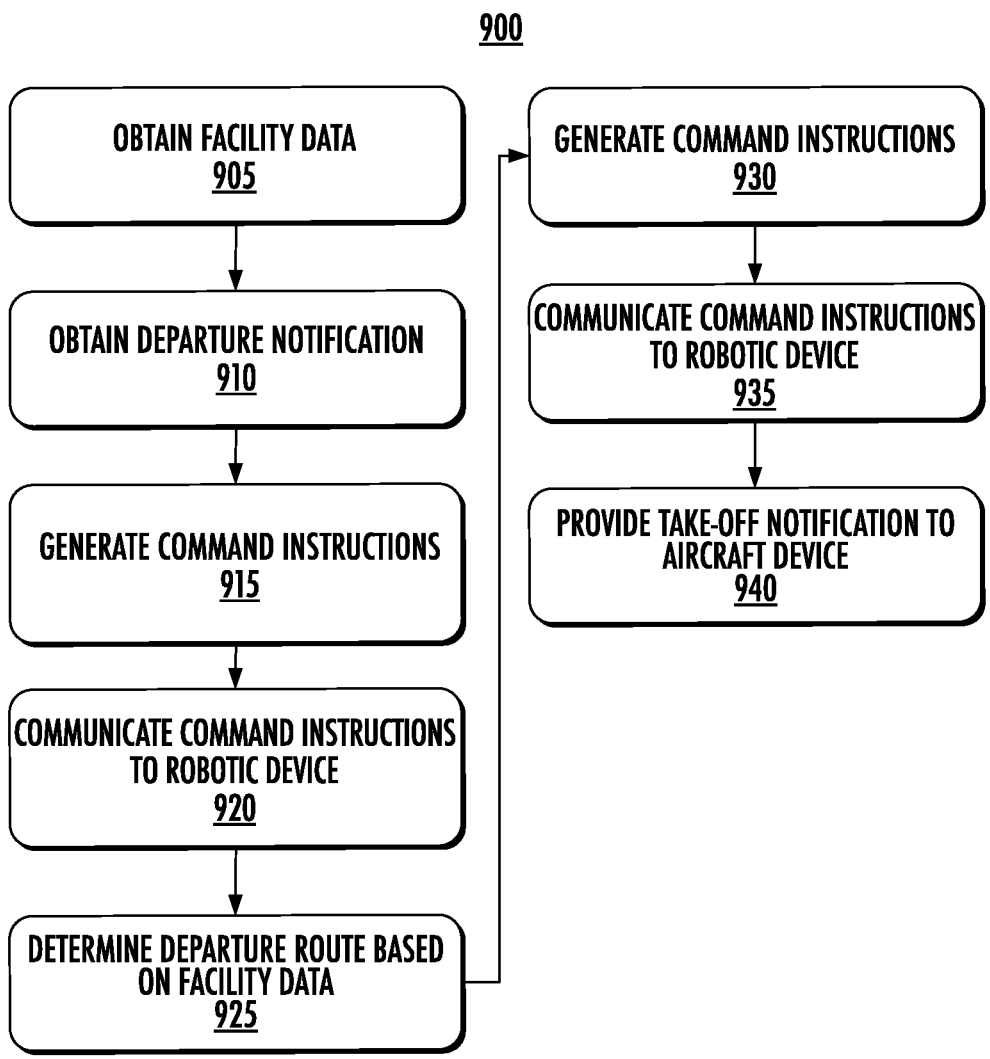
FIG. 9 depicts another flowchart of a method for transferring an aircraft according to aspects of the present disclosure.

Turning to FIG. 9, FIG. 9 depicts another flowchart of a method for transferring an aircraft according to aspects of the present disclosure. One or more portion(s) of the method 900 can be implemented by a computing system that includes one or more computing devices such as, for example, the computing systems described with reference to the other figures (e.g., the cloud services system 102, facility computing device 152, aerial computing device 142, etc.). Each respective portion of the method 900 can be performed by any (or any combination) of one or more computing devices. Moreover, one or more portion(s) of the method 900 can be implemented as an algorithm on the hardware components of the device(s) described herein (e.g., as in FIGS. 1, 2, 4, 10, etc.), for example, to transfer an aircraft within a landing area of an aerial transport facility. FIG. 9 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure. FIG. 9 is described with reference to elements/terms described with respect to other systems and figures for exemplary illustrated purposes and is not meant to be limiting. One or more portions of method 900 can be performed additionally, or alternatively, by other systems.

At 905, the method 900 can include obtaining facility data. For example, a computing system (e.g., computing system 100, cloud services system 102, aerial computing devices 142, facility computing devices 152, robotic computing devices 192, etc.) can obtain facility data associated with a flight itinerary of an aircraft. The facility data can be indicative of at least an aerial transport facility. For instance, the aircraft can be located on a landing pad of the landing area.

At 910, the method 900 can include obtaining a departure notification. For example, a computing system (e.g., computing system 100, cloud services system 102, aerial computing devices 142, facility computing devices 152, robotic computing devices 192, etc.) can obtain a departure notification indicating that the aircraft is ready to take-off from the landing pad.

At 915, the method 900 can include generating command instructions. For example, a computing system (e.g., computing system 100, cloud services system 102, aerial computing devices 142, facility computing devices 152, robotic computing devices 192, etc.) can generate one or more command instructions for a robotic device physically connected to the aircraft to disconnect from the aircraft.

At 920, the method 900 can include communicating command instructions to the robotic device. For example, a computing system (e.g., computing system 100, cloud services system 102, aerial computing devices 142, facility computing devices 152, robotic computing devices 192, etc.) can, in response to the departure notification, communicate the one or more command instructions for a robotic device physically connected to the aircraft to disconnect from the aircraft.

At 925, the method 900 can include determining a departure route based on the facility data. For example, a computing system (e.g., computing system 100, cloud services system 102, aerial computing devices 142, facility computing devices 152, robotic computing devices 192, etc.) can determine a departure route for the robotic device to travel within the landing area based, at least in part, on the facility data. For example, the computing system can access map data indicative of the landing area of the aerial transport facility. The map data can identify one or more landing pads of the landing area. The computing system can determine the departure route for the robotic device to travel within the landing area based, at least in part, on the map data.

At 930, the method 900 can include generating command instructions. For example, a computing system (e.g., computing system 100, cloud services system 102, aerial computing devices 142, facility computing devices 152, robotic computing devices 192, etc.) can generate one or more command instructions for the robotic device to travel in accordance with the departure route.

At 935, the method 900 can include communicating command instructions to robotic device. For example, a computing system (e.g., computing system 100, cloud services system 102, aerial computing devices 142, facility computing devices 152, robotic computing devices 192, etc.) can communicate the one or more command instructions for the robotic device to travel in accordance with the departure route.

At 940, the method 900 can include providing a take-off notification to the aircraft device. For example, a computing system (e.g., computing system 100, cloud services system 102, aerial computing devices 142, facility computing devices 152, robotic computing devices 192, etc.) can provide a take-off notification to an aircraft device of the aircraft indicative of the progress of the robotic device along the departure route. For example, the computing system can obtain a location corresponding to the robotic device, compare the location to a take-off safety threshold, and/or provide the take-off notification to the aircraft device in response to determining that the location is past the take-off safety threshold.

FIG. 10 depicts example system components of an example system 1000 according to example embodiments of the present disclosure. The example system 1000 can include the computing system 1005 (e.g., a cloud services system 102) and the computing system(s) 1050 (e.g., rider device(s) 140, aerial computing device(s) 142, service provider computing device(s) 150, 160, 170, facility computing device(s) 152, robotic computing device(s) 192, etc.), etc. that are communicatively coupled over one or more network(s) 1045.

The computing system 1005 can include one or more computing device(s) 1010. The computing device(s) 1010 of the computing system 1005 can include processor(s) 1015 and a memory 1020. The one or more processors 1015 can be any suitable processing device (e.g., a processor core, a microprocessor, an ASIC, a FPGA, a controller, a microcontroller, etc.) and can be one processor or a plurality of processors that are operatively connected. The memory 1020 can include one or more non-transitory computer-readable storage media, such as RAM, ROM, EEPROM, EPROM, one or more memory devices, flash memory devices, etc., and combinations thereof.

The memory 1020 can store information that can be accessed by the one or more processors 1015. For instance, the memory 1020 (e.g., one or more non-transitory computer-readable storage mediums, memory devices) can include computer-readable instructions 1025 that can be executed by the one or more processors 1015. The instructions 1025 can be software written in any suitable programming language or can be implemented in hardware. Additionally, or alternatively, the instructions 1025 can be executed in logically and/or virtually separate threads on processor(s) 1015.

For example, the memory 1020 can store instructions 1025 that when executed by the one or more processors 1015 cause the one or more processors 1015 to perform operations such as any of the operations and functions of the vehicle computing system 112, or for which the computing systems (e.g., cloud services system) are configured, as described herein.

The memory 1020 can store data 1030 that can be obtained, received, accessed, written, manipulated, created, and/or stored. The data 1030 can include, for instance, facility data, map data, robotic data, aerial transfer data, and/or other data/information described herein. In some implementations, the computing device(s) 1010 can obtain from and/or store data in one or more memory device(s) that are remote from the computing system 1005 such as one or more memory devices of the computing system 1050.

The computing device(s) 1010 can also include a communication interface 1035 used to communicate with one or more other system(s) (e.g., computing system 1050). The communication interface 1035 can include any circuits, components, software, etc. for communicating via one or more networks (e.g., 1045). In some implementations, the communication interface 1035 can include for example, one or more of a communications controller, receiver, transceiver, transmitter, port, conductors, software and/or hardware for communicating data/information.

The computing system 1050 can include one or more computing devices 1055. The one or more computing devices 1055 can include one or more processors 1060 and a memory 1065. The one or more processors 1060 can be any suitable processing device (e.g., a processor core, a microprocessor, an ASIC, a FPGA, a controller, a microcontroller, etc.) and can be one processor or a plurality of processors that are operatively connected. The memory 1065 can include one or more non-transitory computer-readable storage media, such as RAM, ROM, EEPROM, EPROM, one or more memory devices, flash memory devices, etc., and combinations thereof.

The memory 1065 can store information that can be accessed by the one or more processors 1060. For instance, the memory 1065 (e.g., one or more non-transitory computer-readable storage mediums, memory devices) can store data 1075 that can be obtained, received, accessed, written, manipulated, created, and/or stored. The data 1075 can include, for instance, facility data, robotic data, aerial transfer data, map data, rider data, and/or other data or information described herein. In some implementations, the computing system 1050 can obtain data from one or more memory device(s) that are remote from the computing system 1050.

The memory 1065 can also store computer-readable instructions 1070 that can be executed by the one or more processors 1060. The instructions 1070 can be software written in any suitable programming language or can be implemented in hardware. Additionally, or alternatively, the instructions 1070 can be executed in logically and/or virtually separate threads on processor(s) 1060. For example, the memory 1065 can store instructions 1070 that when executed by the one or more processors 1060 cause the one or more processors 1060 to perform any of the operations and/or functions described herein, including, for example, any of the operations and functions of the devices described herein, and/or other operations and functions.

The computing device(s) 1055 can also include a communication interface 1080 used to communicate with one or more other system(s). The communication interface 1080 can include any circuits, components, software, etc. for communicating via one or more networks (e.g., 1045). In some implementations, the communication interface 1080 can include for example, one or more of a communications controller, receiver, transceiver, transmitter, port, conductors, software and/or hardware for communicating data/information.

The network(s) 1045 can be any type of network or combination of networks that allows for communication between devices. In some embodiments, the network(s) 1045 can include one or more of a local area network, wide area network, the Internet, secure network, cellular network, mesh network, peer-to-peer communication link and/or some combination thereof and can include any number of wired or wireless links. Communication over the network(s) 1045 can be accomplished, for instance, via a network interface using any type of protocol, protection scheme, encoding, format, packaging, etc.

FIG. 10 illustrates one example system 1000 that can be used to implement the present disclosure. Other computing systems can be used as well. Computing tasks discussed herein as being performed at a cloud services system can instead be performed remote from the cloud services system (e.g., via aerial computing devices, robotic computing devices, facility computing devices, etc.), or vice versa. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implemented tasks and/or operations can be performed sequentially or in parallel. Data and instructions can be stored in a single memory device or across multiple memory devices.

While the present subject matter has been described in detail with respect to specific example embodiments and methods thereof, it will be appreciated that those skilled in the art, upon attaining an understanding of the foregoing can readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computing system for transporting an aircraft, the computing system comprising:
   one or more processors; and
   one or more non-transitory computer-readable media that collectively store instructions that, when executed by the one or more processors, cause the computing system to perform operations, the operations comprising:
      obtaining facility data associated with a flight itinerary of the aircraft, wherein the facility data is indicative of at least an aerial transport facility at which the aircraft is located or to be located;
      determining a robotic device of a plurality of robotic devices to transport the aircraft within a landing area of the aerial transport facility based, at least in part, on the facility data;
      generating a pick-up route for the robotic device to travel within the landing area to the aircraft based, at least in part, on one or more geofences dynamically generated for a current state of the aircraft landing area indicated by the facility data, wherein the one or more geofences define one or more prohibited areas of the landing area, wherein the one or more prohibited areas correspond to a passenger walkway; and
      communicating one or more command instructions for the robotic device to travel in accordance with the pick-up route.

2. The computing system of claim 1, wherein the operations further comprise:
   obtaining data indicative of at least one of a power level, type, location, or schedule of one or more of the plurality of robotic devices; and
   selecting, from among the plurality of robotic devices, the robotic device to transport the aircraft within the landing area of the aerial transport facility based, at least in part, on the data.

3. The computing system of claim 2, wherein the facility data comprises aerial transfer data indicative of one or more flight itineraries for a plurality of other aircraft scheduled to park at or take-off from the aerial transport facility, and wherein the robotic device to transport the aircraft within the landing area of the aerial transport facility is determined based, at least in part, on the aerial transfer data.

4. The computing system of claim 1, wherein the operations further comprise:
   determining the passenger walkway based on a boarding time or a deboarding time associated with the aircraft.

5. The computing system of claim 4, wherein the operations further comprise:
   maintaining the one or more geofences during a boarding duration based on a time of a last passenger to board the aircraft.

6. The computing system of claim 4, wherein the one or more prohibited areas comprise at least one of one or more aircraft parking areas or aircraft landing pads.

7. The computing system of claim 1, wherein the operations further comprise:
   obtaining a landing notification indicating that the aircraft has landed at the landing area of the aerial transport facility; and
   in response to the landing notification, communicating one or more command instructions to the robotic device to connect to landing gear of the aircraft.

8. The computing system of claim 1, wherein the robotic device comprises one or more sensors, and wherein the robotic device is configured to:
- obtain sensor data from the one or more sensors;
- identify a landing gear location corresponding to the landing gear of the aircraft; and
- automatically connect to the landing gear of the aircraft based, at least in part, on the landing gear location.

9. The computing system of claim 1, wherein the operations further comprise:
- determining the pick-up route for the robotic device to travel within the landing area to the aircraft based, at least in part, on rider data associated with a plurality of aircraft passengers.

10. A computer-implemented method, the method comprising:
- obtaining, by a computing system comprising one or more computing devices, facility data associated with a flight itinerary of an aircraft, wherein the facility data is indicative of at least an aerial transport facility;
- determining, by the computing system, a parking location for the aircraft based, at least in part, on the facility data;
- generating, by the computing system, a parking route for a robotic device physically connected to the aircraft to travel within a landing area of the aerial transport facility to the parking location based, at least in part, on one or more geofences dynamically generated for a current state of the aircraft landing area indicated by the facility data, wherein the one or more geofences define one or more prohibited areas of the landing area, wherein the one or more prohibited areas correspond to a passenger walkway; and
- communicating, by the computing system, one or more command instructions for the robotic device to travel in accordance with the parking route.

11. The computer-implemented method of claim 10, wherein the facility data comprises aerial transfer data indicative of one or more flight itineraries for a plurality of other aircraft scheduled to park at or take-off from the aerial transport facility, and
- wherein the parking location for the aircraft is determined based, at least in part, on the aerial transfer data.

12. The computer-implemented method of claim 11, further comprising:
- determining, by the computing system, a parking time for the aircraft at the parking location based, at least in part, on the flight itinerary.

13. The computer-implemented method of claim 12, wherein the facility data comprises rider data associated with a plurality of aircraft passengers, and wherein determining the parking time for the aircraft at the parking location comprises:
- determining, by the computing system, a boarding duration for the aircraft based, at least in part, on the rider data; and
- determining, by the computing system, the parking time for the aircraft at the parking location based, at least in part, on the boarding duration.

14. The computer-implemented method of claim 12, wherein the flight itinerary for the aircraft comprises a boarding time and an estimated departure time.

15. The computer-implemented method of claim 14, further comprising:
- determining a drop-off route for the robotic device to travel within the landing area to a landing pad of the aerial transport facility based, at least in part, on the estimated departure time.

16. The computer-implemented method of claim 14, wherein the robotic device remains physically connected to the aircraft during the parking time.

17. A computer-implemented method, the method comprising:
- obtaining, by a computing system comprising one or more computing devices, facility data associated with a flight itinerary of an aircraft, wherein the facility data is indicative of at least an aerial transport facility, wherein the aircraft is located on a landing pad of a landing area of the aerial transport facility;
- obtaining, by the computing system, a departure notification indicating that the aircraft is ready to take-off from the landing pad;
- in response to the departure notification, communicating, by the computing system, one or more command instructions for a robotic device physically connected to the aircraft to disconnect from the aircraft;
- generating, by the computing system, a departure route for the robotic device to travel within the landing area based, at least in part, on one or more geofences dynamically generated for a current state of the aircraft landing area indicated by the facility data, wherein the one or more geofences define one or more prohibited areas of the landing area, wherein the one or more prohibited areas correspond to a passenger walkway;
- communicating, by the computing system, one or more command instructions for the robotic device to travel in accordance with the departure route; and
- providing, by the computing system, a take-off notification to an aircraft device of the aircraft indicative of progress of the robotic device along the departure route.

18. The computer-implemented method of claim 17, further comprising:
- accessing, by the computing system, map data indicative of the landing area of the aerial transport facility, wherein the map data identifies one or more landing pads of the landing area; and
- determining, by the computing system, the departure route for the robotic device to travel within the landing area based, at least in part, on the map data.

19. The computer-implemented method of claim 18, wherein providing, by the computing system, the take-off notification to the aircraft device comprises:
- obtaining, by the computing system, a location corresponding to the robotic device;
- comparing, by the computing system, the location to a take-off safety threshold; and
- providing, by the computing system, the take-off notification to the aircraft device in response to determining that the location is past the take-off safety threshold.

20. The computer-implemented method of claim 17, further comprising:
- determining the passenger walkway based on a boarding time or a deboarding time associated with the aircraft; and
- maintaining the one or more geofences during a boarding duration based on a time of a last passenger to board the aircraft.

* * * * *